US011617418B2

(12) United States Patent
Lyke

(10) Patent No.: US 11,617,418 B2
(45) Date of Patent: Apr. 4, 2023

(54) UPPER STRUCTURE FOR ARTICLE OF FOOTWEAR AND ARTICLE OF FOOTWEAR

(71) Applicant: NIKE, Inc., Beaverton, OR (US)

(72) Inventor: Christopher J. Lyke, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 17/331,099

(22) Filed: May 26, 2021

(65) Prior Publication Data
US 2021/0368942 A1 Dec. 2, 2021

Related U.S. Application Data

(60) Provisional application No. 63/032,666, filed on May 31, 2020.

(51) Int. Cl.
*A43B 23/02* (2006.01)
*A43B 11/00* (2006.01)
*A43B 3/00* (2022.01)

(52) U.S. Cl.
CPC .......... *A43B 23/0285* (2013.01); *A43B 11/00* (2013.01); *A43B 23/029* (2013.01); *A43B 3/0078* (2013.01)

(58) Field of Classification Search
CPC .... A43B 23/0285; A43B 23/029; A43B 11/00
See application file for complete search history.

(56) References Cited

U.S. PATENT DOCUMENTS

| | | | | | |
|---|---|---|---|---|---|
| 2,772,489 | A | * | 12/1956 | Porter | A43B 23/081 2/2.5 |
| 5,113,526 | A | * | 5/1992 | Wang | A41D 31/245 36/58 |
| 5,606,808 | A | * | 3/1997 | Gilliard | A43B 5/0401 36/89 |
| 5,839,211 | A | * | 11/1998 | Pallera | A43B 1/0072 36/137 |

(Continued)

FOREIGN PATENT DOCUMENTS

| | | | | | |
|---|---|---|---|---|---|
| GB | 2517399 | A | * | 2/2015 | A43B 11/00 |
| WO | WO-2011082275 | A1 | | 7/2011 | |

OTHER PUBLICATIONS

European Patent Office, International Search Report and Written Opinion dated Sep. 17, 2021 for application No. PCT/US2021/034261.

*Primary Examiner* — Ted Kavanaugh
(74) *Attorney, Agent, or Firm* — Honigman LLP; Matthew H. Szalach; Jonathan P. O'Brien

(57) ABSTRACT

An upper for an article of footwear includes a first material defining a void operable to selectively receive a foot. The first material includes an outer surface. The upper also includes a first edge at least partially circumscribing the void at an uppermost extremity of the upper and a second edge disposed at a lowermost extremity of the upper. The upper further includes a first biasing member (i) disposed at the outer surface of the upper, (ii) attached to the first material, and (iii) spaced apart from the first edge and the second edge. The first biasing member is operable to exert a biasing force on the first material to bias the first edge away from the second edge.

18 Claims, 14 Drawing Sheets

(56) References Cited

U.S. PATENT DOCUMENTS

| | | | | |
|---|---|---|---|---|
| 5,896,683 A * | 4/1999 | Foxen | ............ | A43B 23/08 |
| | | | | 36/89 |
| 6,170,175 B1 * | 1/2001 | Funk | ............ | A43B 5/049 |
| | | | | 36/89 |
| 6,523,282 B1 * | 2/2003 | Johnston | ............ | A43B 5/02 |
| | | | | 36/133 |
| 7,155,846 B2 * | 1/2007 | Alfaro | ............ | A43B 1/0027 |
| | | | | 36/45 |
| 7,421,806 B2 * | 9/2008 | Braynock | ............ | A43B 3/00 |
| | | | | 2/239 |
| 8,161,665 B2 * | 4/2012 | Nakano | ............ | A43B 23/07 |
| | | | | 36/71 |
| 8,875,418 B2 * | 11/2014 | Long | ............ | A43B 23/0265 |
| | | | | 36/50.1 |
| 10,702,018 B2 * | 7/2020 | Beye | ............ | A43B 23/0285 |
| 2004/0255490 A1 * | 12/2004 | Wan | ............ | A43B 1/0072 |
| | | | | 36/137 |
| 2010/0180469 A1 * | 7/2010 | Baucom | ............ | A43B 3/0031 |
| | | | | 36/55 |
| 2013/0125417 A1 * | 5/2013 | Minami | ............ | A43B 23/088 |
| | | | | 36/83 |
| 2017/0215517 A1 * | 8/2017 | Silva | ............ | A43B 23/0245 |
| 2017/0318905 A1 * | 11/2017 | Beye | ............ | A43B 1/0027 |
| 2018/0110286 A1 * | 4/2018 | Vuong | ............ | A43B 13/206 |
| 2019/0000186 A1 * | 1/2019 | Mou | ............ | A43B 23/029 |
| 2020/0305552 A1 * | 10/2020 | Cheney | ............ | A43B 11/00 |
| 2021/0368942 A1 * | 12/2021 | Lyke | ............ | A43B 23/029 |

* cited by examiner

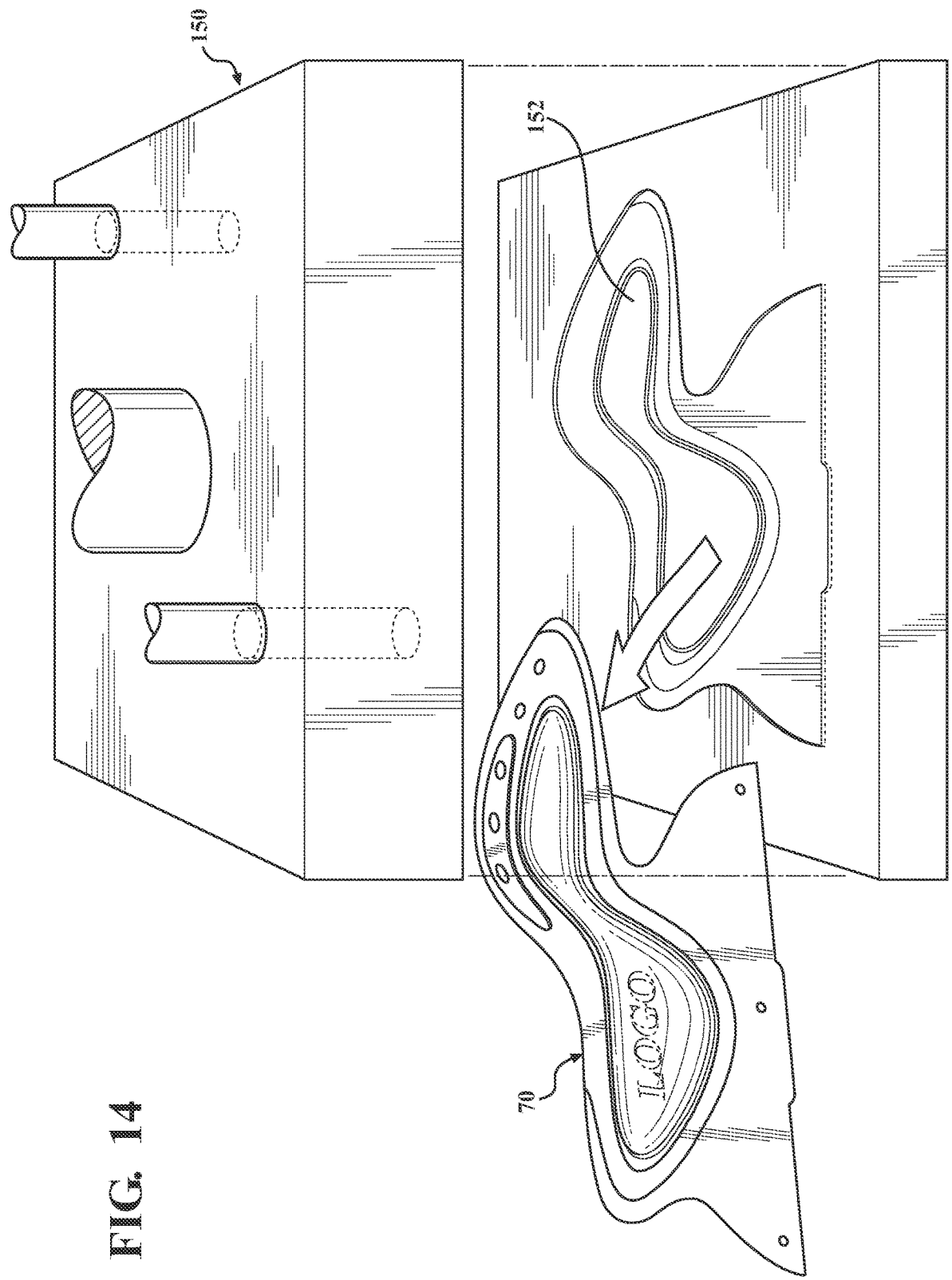

UPPER STRUCTURE FOR ARTICLE OF FOOTWEAR AND ARTICLE OF FOOTWEAR

CROSS REFERENCE TO RELATED APPLICATIONS

This application claims priority under 35 U.S.C. § 119(e) to U.S. Provisional Application No. 63/032,666, filed on May 31, 2020. The disclosure of this prior application is considered part of the disclosure of this application and is hereby incorporated by reference in its entirety.

FIELD

The present disclosure relates to an article of footwear and more particularly to an upper structure for an article of footwear.

BACKGROUND

This section provides background information related to the present disclosure which is not necessarily prior art.

Articles of footwear conventionally include an upper and a sole structure. The upper may be formed from any suitable material(s) to receive, secure, and support a foot on the sole structure. The upper may cooperate with laces, straps, or other fasteners to adjust the fit of the upper around the foot. A bottom portion of the upper, proximate to a bottom surface of the foot, attaches to the sole structure.

Sole structures generally include a layered arrangement extending between a ground surface and the upper. One layer of the sole structure includes an outsole that provides abrasion-resistance and traction with the ground surface. The outsole may be formed from rubber or other materials that impart durability and wear-resistance, as well as enhance traction with the ground surface. Another layer of the sole structure includes a midsole disposed between the outsole and the upper. The midsole provides cushioning for the foot and is generally at least partially formed from a polymer foam material that compresses resiliently under an applied load to cushion the foot by attenuating ground-reaction forces. The midsole may define a bottom surface on one side that opposes the outsole and a footbed on the opposite side that may be contoured to conform to a profile of the bottom surface of the foot. Sole structures may also include a comfort-enhancing insole or a sockliner located within a void proximate to the bottom portion of the upper.

While conventional uppers and sole structures adequately provide cushioning and support to a foot during use of an article of footwear, footwear manufacturers strive to improve the overall performance and ease-of-use of articles of footwear. Such efforts are especially focused on making use of an article of footwear easier in terms of entry of a foot into the upper and tightening of the upper about a foot of a wearer for persons with limited or impaired mobility.

DRAWINGS

The drawings described herein are for illustrative purposes only of selected configurations and are not intended to limit the scope of the present disclosure.

FIG. 14 is a perspective view of the mold of FIG. 12 in an open state showing a completed bladder assembly of FIG. 8.

Corresponding reference numerals indicate corresponding parts throughout the drawings.

DETAILED DESCRIPTION

Figure 1:
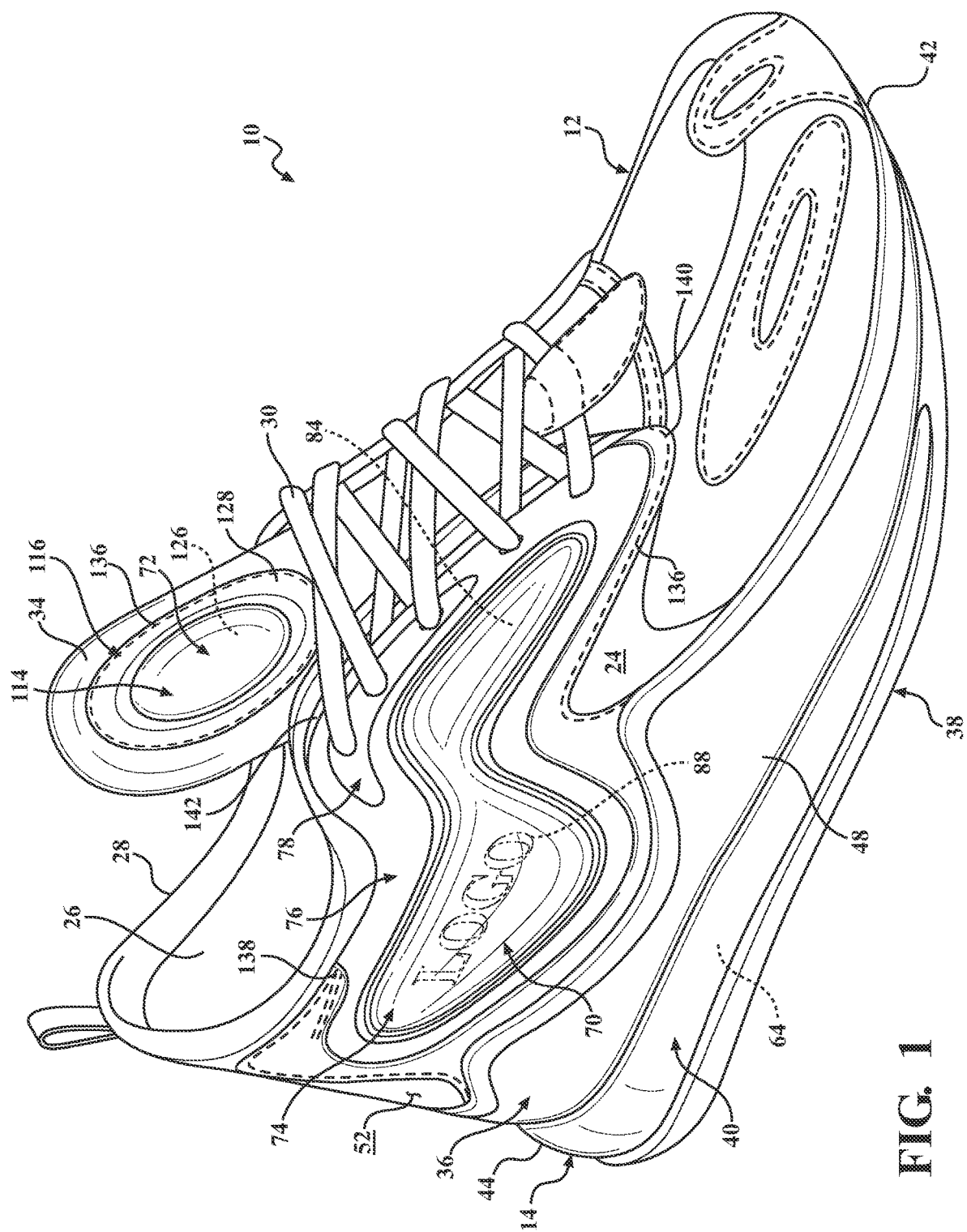
FIG. 1 is a perspective view of an article of footwear in accordance with the principles of the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

One aspect of the disclosure provides an upper for an article of footwear. The upper includes a first material defining a void operable to selectively receive a foot. The first material includes an outer surface. The upper also includes a first edge at least partially circumscribing the void at an uppermost extremity of the upper and a second edge disposed at a lowermost extremity of the upper. The upper further includes a first biasing member (i) disposed at the outer surface of the upper, (ii) attached to the first material, and (iii) spaced apart from the first edge and the second edge. The first biasing member is operable to exert a biasing force on the first material to bias the first edge away from the second edge.

Implementations of the disclosure may include one or more of the following optional features. In some implementations, the first biasing member is disposed at one of a medial side and a lateral side of the upper. Here, the first biasing member may be a first fluid-filled chamber. The first fluid-filled chamber may form an outer surface of the upper and/or may be pressurized. The upper may include a second biasing member disposed at the other of the medial side and the lateral side. The second biasing member may be a second fluid-filled chamber. At least one of the first fluid-filled chamber and the second fluid-filled chamber may be elongate. The at least one of the first fluid-filled chamber and the second fluid-filled chamber may include a longitudinal axis that extends in a direction between an anterior end of the upper and a posterior end of the upper. An article of footwear may incorporate the upper.

Another aspect of the disclosure provides an upper for an article of footwear. The upper includes a first material defining a void operable to selectively receive a foot, the first material including an outer surface. The upper also includes a first edge partially circumscribing the void at an uppermost extremity of the upper on a medial side of the upper. The upper further includes a second edge partially circumscribing the void at the uppermost extremity of the upper on a lateral side of the upper. The upper also includes a first biasing member (i) disposed at the outer surface of the upper at a medial side of the upper, (ii) attached to the first material, and (iii) spaced apart from the first edge. The upper further includes a second biasing member (i) disposed at the outer surface of the upper at a lateral side of the upper, (ii) attached to the first material, and (iii) spaced apart from the second edge. The first biasing member and the second biasing member are operable to exert a biasing force on the first material to bias the first edge and the second edge away from one another.

This aspect may include one or more of the following optional features. In some examples, the first biasing member is a first fluid-filled chamber. Here, the second biasing member may be a second fluid-filled chamber. The first fluid-filled chamber may form an outer surface of the upper at the medial side and the second fluid-filled chamber may form an outer surface of the upper at the lateral side. The first fluid-filled chamber and the second fluid-filled chamber may be pressurized. The upper may include a gap disposed between at least one of (i) the first fluid-filled chamber and the first material and (ii) the second fluid-filled chamber and the first material. The first material may be visible through the first fluid-filled chamber and the second fluid-filled chamber. At least one of the first fluid-filled chamber and the second fluid-filled chamber may be elongate. The at least one of the first fluid-filled chamber and the second fluid-filled chamber may include a longitudinal axis that extends in a direction between an anterior end of the upper and a posterior end of the upper. An article of footwear may incorporate the upper.

Yet another aspect of the disclosure provides an upper for an article of footwear. The upper includes a first material defining a void operable to selectively receive a foot. The upper also includes a bladder assembly (i) disposed at an outer surface of the upper, (ii) attached to the first material, and (iii) including a fluid-filled chamber and a flange extending around an outer perimeter of the fluid-filled chamber. The flange is formed from a different material than a material of the fluid-filled chamber and secures the fluid-filled chamber to the first material.

This aspect may include one or more of the following optional features. In some configurations, the flange is formed from thermoplastic polyurethane (TPU). The flange may be sewn to the first material via stitching to attach the fluid-filled chamber to the first material. Here, a material of the flange may be bonded to the first material to attach the fluid-filled chamber to the first material.

In some implementations, the flange includes a reinforced section. Here, the reinforced section may include at least one of a different thickness and a different material than the flange. Optionally, the reinforced section may include at least one aperture, the at least one aperture may be operable to receive a fastener to selectively constrict the upper. In some examples, the flange includes a first portion attached to the first material and a second portion movable relative to the first material. The bladder assembly may be disposed at a medial side of the upper, a lateral side of the upper, or a vamp portion of the upper.

In some configurations, the fluid-filled chamber is formed from a first barrier layer and a second barrier layer, the first barrier layer and the second barrier layer being joined together to define an interior void operable to receive a fluid. Here, the fluid may be air. Additionally or alternatively, the fluid may be pressurized. The first barrier layer and the second barrier layer may be substantially transparent. Here, at least one of the first barrier layer and the second barrier layer may include a graphic. The graphic may be viewable through the first barrier layer. Optionally, one of the first barrier layer and the second barrier layer may be substantially transparent and the other of the first barrier layer and the second barrier layer may be opaque. Here, the other of the first barrier layer and the second barrier layer may include a graphic. The graphic may be viewable through the first barrier layer. An article of footwear may incorporate the upper.

Another aspect of the disclosure provides an upper for an article of footwear. The upper includes a first material defining a void operable to selectively receive a foot. The upper also includes a bladder assembly (i) disposed at an outer surface of the upper, (ii) attached to the first material, and (iii) including a fluid-filled chamber and a flange extending around an outer perimeter of the fluid-filled chamber. The flange has a greater rigidity than the fluid-filled chamber and secures the fluid-filled chamber to the first material.

This aspect of the disclosure may include one or more of the following optional features. In some implementations, the flange is formed from thermoplastic polyurethane (TPU). The flange may be sewn to the first material via stitching to attach the fluid-filled chamber to the first material. A material of the flange may be bonded to the first material to attach the fluid-filled chamber to the first material.

In some examples, the flange includes a reinforced section. Here, the reinforced section may include at least one of a different thickness and a different material than the flange. Optionally, the reinforced section may include at least one aperture, the at least one aperture may be operable to receive a fastener to selectively constrict the upper. The flange may include a first portion attached to the first material and a second portion movable relative to the first material. The bladder assembly may be disposed at a medial side of the upper, a lateral side of the upper, or a vamp portion of the upper.

In some configurations, the fluid-filled chamber is formed from a first barrier layer and a second barrier layer, the first barrier layer and the second barrier layer being joined together to define an interior void operable to receive a fluid. Here, the fluid may be air. Optionally, the fluid may be pressurized. The first barrier layer and the second barrier layer may be substantially transparent. At least one of the first barrier layer and the second barrier layer may include a graphic. The graphic may be viewable through the first barrier layer. Additionally or alternatively, one of the first barrier layer and the second barrier layer may be substantially transparent and the other of the first barrier layer and the second barrier layer may be opaque. Here, the other of the first barrier layer and the second barrier layer may include a graphic. The graphic may be viewable through the first barrier layer. An article of footwear may incorporate the upper.

Yet another aspect of the disclosure provides an upper for an article of footwear. The upper includes a first material defining a void operable to selectively receive a foot. The upper also includes a bladder assembly (i) disposed at an outer surface of the upper, (ii) attached to the first material, and (iii) including a fluid-filled chamber and a flange (a) extending around an outer perimeter of the fluid-filled chamber and (b) securing the fluid-filled chamber to the first material. The fluid-filled chamber and the flange are movable relative to the first material.

This aspect of the disclosure may include one or more of the following optional features. In some examples, the flange is formed from thermoplastic polyurethane (TPU). Here, the flange is sewn to the first material via stitching along a portion of the flange to attach the fluid-filled chamber to the first material. A material of the flange may be bonded to the first material to attach the fluid-filled chamber to the first material.

In some configurations, the flange includes a reinforced section. The reinforced section may include at least one of a different thickness and a different material than the flange. Optionally, the reinforced section may include at least one aperture, the at least one aperture may be operable to receive a fastener to selectively constrict the upper. The flange may include a first portion attached to the first material and a second portion spaced apart from the first material, the second portion being movable relative to the first material. The bladder assembly may be disposed at a medial side of the upper, a lateral side of the upper, or a vamp portion of the upper.

In some implementations, the fluid-filled chamber is formed from a first barrier layer and a second barrier layer, the first barrier layer and the second barrier layer being joined together to define an interior void operable to receive a fluid. Here, the fluid may be air. Additionally or alternatively, the fluid may be pressurized. The first barrier layer and the second barrier layer may be substantially transparent. Here, at least one of the first barrier layer and the second barrier layer may include a graphic. The graphic may be viewable through the first barrier layer. Optionally, one of the first barrier layer and the second barrier layer may be substantially transparent and the other of the first barrier layer and the second barrier layer may be opaque. Here, the other of the first barrier layer and the second barrier layer may include a graphic. The graphic may be viewable through the first barrier layer. An article of footwear may incorporate the upper.

Another aspect of the disclosure provides an upper for an article of footwear. The upper includes a first material defining a void operable to selectively receive a foot. The upper also includes a bladder assembly (i) disposed at an outer surface of the upper, (ii) attached to the first material, and (iii) including a fluid-filled chamber and a flange. The flange (a) extends around an outer perimeter of the fluid-filled chamber and (b) secures the fluid-filled chamber to the first material. The fluid-filled chamber includes a first region and a second region in fluid communication with one another and joined by a passageway having a smaller cross-sectional area than the first region and the second region.

This aspect of the disclosure may include one or more of the following optional features. In some configurations, the flange is formed from thermoplastic polyurethane (TPU). Here, the flange may be sewn to the first material via stitching to attach the fluid-filled chamber to the first material. A material of the flange may bonded to the first material to attach the fluid-filled chamber to the first material.

In some implementations, the flange includes a reinforced section. The reinforced section may include at least one of a different thickness and a different material than the flange. Optionally, the reinforced section may include at least one aperture, the at least one aperture operable to receive a fastener to selectively constrict the upper. The flange may include a first portion attached to the first material and a second portion movable relative to the first material. The bladder assembly may be disposed at a medial side of the upper, a lateral side of the upper, or a vamp portion of the upper.

In some examples, the fluid-filled chamber is formed from a first barrier layer and a second barrier layer, the first barrier layer and the second barrier layer being joined together to define an interior void operable to receive a fluid. Here, the fluid may be air. Additionally or alternatively, the fluid may be pressurized. The first barrier layer and the second barrier layer may be substantially transparent. Here, at least one of the first barrier layer and the second barrier layer may include a graphic. The graphic may be viewable through the first barrier layer. Optionally, one of the first barrier layer and the second barrier layer may be substantially transparent and the other of the first barrier layer and the second barrier layer may be opaque. Here, the other of the first barrier layer and the second barrier layer may include a graphic. The graphic may be viewable through the first barrier layer. An article of footwear may incorporate the upper.

Yet another aspect of the disclosure provides an upper for an article of footwear. The upper includes a first material defining a void operable to selectively receive a foot. The upper also includes a bladder assembly (i) disposed at an outer surface of the upper, (ii) attached to the first material, and (iii) including a fluid-filled chamber and a flange. The flange (a) extends around an outer perimeter of the fluid-filled chamber and (b) secures the fluid-filled chamber to the first material. The fluid-filled chamber opposes and is in contact with the first material.

This aspect of the disclosure may include one or more of the following optional features. In some implementations, the flange is formed from thermoplastic polyurethane (TPU). Here, the flange may be sewn to the first material via stitching along a portion of the flange to attach the fluid-filled chamber to the first material. A material of the flange may be bonded to the first material to attach the fluid-filled chamber to the first material.

In some examples, the flange includes a reinforced section. Here, the reinforced section may include at least one of a different thickness and a different material than the flange. The reinforced section may include at least one aperture, the at least one aperture may be operable to receive a fastener to selectively constrict the upper. The flange may include a first portion attached to the first material and a second portion spaced apart from the first material, the second portion being movable relative to the first material. The bladder assembly may be disposed at a medial side of the upper, a lateral side of the upper, or a vamp portion of the upper.

In some configurations, the fluid-filled chamber is formed from a first barrier layer and a second barrier layer, the first barrier layer and the second barrier layer being joined together to define an interior void operable to receive a fluid. Here, the fluid may be air. Additionally or alternatively, the fluid may be pressurized. The first barrier layer and the second barrier layer may be substantially transparent. Here, at least one of the first barrier layer and the second barrier layer may include a graphic. The graphic may be viewable through the first barrier layer. Optionally, one of the first barrier layer and the second barrier layer may be substantially transparent and the other of the first barrier layer and the second barrier layer may be opaque. The other of the first barrier layer and the second barrier layer may include a graphic. The graphic may be viewable through the first barrier layer. An article of footwear may incorporate the upper.

The details of one or more implementations of the disclosure are set forth in the accompanying drawings and the description below. Other aspects, features, and advantages will be apparent from the description and drawings, and from the claims.

With reference to FIGS. 1-10, an article of footwear 10 is provided and includes an upper 12 and a sole structure 14 attached to the upper 12. The article of footwear 10 may be divided into one or more regions. The regions may include a forefoot region 16, a mid-foot region 18, and a heel region 20. The forefoot region 16 may correspond with toes and joints connecting metatarsal bones with phalanx bones of a foot. The mid-foot region 18 may correspond with an arch area of the foot while the heel region 20 may correspond with rear portions of the foot, including a calcaneus bone. The article of footwear 10 may additionally include a medial side 22 and a lateral side 24 that correspond with opposite sides of the article of footwear 10 and extend through the regions 16, 18, 20.

The upper 12 includes interior surfaces that define an interior void 26 that receives and secures a foot for support on the sole structure 14. An ankle opening 28 in the heel region 20 may provide access to the interior void 26. For example, the ankle opening 28 may receive a foot to secure the foot within the void 26 and facilitate entry and removal of the foot from and to the interior void 26. In some examples, one or more fasteners 30 extend along the upper 12 to adjust a fit of the interior void 26 around the foot while concurrently accommodating entry and removal of the foot therefrom. The upper 12 may include apertures 32 such as eyelets and/or other engagement features such as fabric or mesh loops that receive the fasteners 30. The fasteners 30 may include laces, straps, cords, hook-and-loop, or any other suitable type of fastener.

The upper 12 may additionally include a tongue portion 34 that extends between the interior void 26 and the fasteners 30. The upper 12 may be formed from one or more materials that are stitched or adhesively bonded together to form the interior void 26. Suitable materials of the upper 12 may include, textiles, foam, leather, and synthetic leather. The materials may be selected and located to impart properties of durability, air-permeability, wear-resistance, flexibility, and comfort to the foot while disposed within the interior void 26.

The sole structure 14 is attached to the upper 12 and provides the article of footwear 10 with support and cushioning during use. Namely, the sole structure 14 attenuates ground-reaction forces caused by the article of footwear 10 striking the ground during use. Accordingly, and as set forth below, the sole structure 14 may incorporate one or more materials having energy absorbing characteristics to allow the sole structure 14 to minimize the impact experienced by a user when wearing the article of footwear 10.

The sole structure 14 may include a midsole 36, an outsole 38, and a fluid-filled chamber 40 that cooperate to provide the sole structure 14 with support and cushioning during use.

With continued reference to FIGS. 1-10, the midsole 36 is shown as extending from an anterior end 42 of the sole structure 14 to a posterior end 44 of the sole structure 14. Namely, the midsole 36 extends continuously from the anterior end 42 to the posterior end 44 and between a medial side 46 of the sole structure 14 and a lateral side 48 of the sole structure 14. The midsole 36 may be formed from a material such as, for example, polymer foam. In one configuration, the midsole 36 opposes a strobel 50 (FIG. 7) of the upper 12 and may extend at least partially onto an outer surface 52 of the upper 12 (FIG. 1) such that the midsole 36 covers a junction of the upper 12 and the strobel 50.

Forming the midsole 36 from a compliant, yet resilient material such as polymer foam allows the midsole 36 to attenuate ground-reaction forces caused by movement of the article of footwear 10 over ground during use. In addition to attenuating forces associated with use of the article of footwear 10, the midsole 36 may serve to attach the outsole 38 and the fluid-filled chamber 40 to the upper 12. A suitable adhesive (not shown) may be used to attach the midsole 36 and the strobel 50. Alternatively, the fluid-filled chamber 40 may be attached to the midsole 36 by molding a material of the midsole 36 directly to the fluid-filled chamber 40. For example, the fluid-filled chamber 40 may be disposed within a cavity of a mold (not shown) used to form the midsole 36 after formation of the fluid-filled chamber. Accordingly, when the midsole 36 is formed (i.e., by foaming a polymer material), the material of the midsole 36 is joined to the material of the fluid-filled chamber 40, thereby forming a unitary structure having both the midsole 36 and the fluid-filled chamber 40. Once formed, the midsole 36—including the fluid-filled chamber 40—can be attached to the upper 12, the outsole 38, and/or the strobel 50.

As described above, the midsole 36 is formed of a resilient polymeric material, such as foam or rubber, to impart properties of cushioning, responsiveness, and energy distribution to the foot of the wearer. Example resilient polymeric materials for the midsole 36 may include those based on foaming or molding one or more polymers, such as one or more elastomers (e.g., thermoplastic elastomers (TPE)). The one or more polymers may include aliphatic polymers, aromatic polymers, or mixtures of both; and may include homopolymers, copolymers (including terpolymers), or mixtures of both.

In some aspects, the one or more polymers may include olefinic homopolymers, olefinic copolymers, or blends thereof. Examples of olefinic polymers include polyethylene, polypropylene, and combinations thereof. In other aspects, the one or more polymers may include one or more ethylene copolymers, such as, ethylene-vinyl acetate (EVA) copolymers, EVOH copolymers, ethylene-ethyl acrylate copolymers, ethylene-unsaturated mono-fatty acid copolymers, and combinations thereof.

In further aspects, the one or more polymers may include one or more polyacrylates, such as polyacrylic acid, esters of polyacrylic acid, polyacrylonitrile, polyacrylic acetate, polymethyl acrylate, polyethyl acrylate, polybutyl acrylate, polymethyl methacrylate, and polyvinyl acetate; including derivatives thereof, copolymers thereof, and any combinations thereof.

In yet further aspects, the one or more polymers may include one or more ionomeric polymers. In these aspects, the ionomeric polymers may include polymers with carboxylic acid functional groups, sulfonic acid functional groups, salts thereof (e.g., sodium, magnesium, potassium, etc.), and/or anhydrides thereof. For instance, the ionomeric polymer(s) may include one or more fatty acid-modified ionomeric polymers, polystyrene sulfonate, ethylene-methacrylic acid copolymers, and combinations thereof.

In further aspects, the one or more polymers may include one or more styrenic block copolymers, such as acrylonitrile butadiene styrene block copolymers, styrene acrylonitrile block copolymers, styrene ethylene butylene styrene block copolymers, styrene ethylene butadiene styrene block copolymers, styrene ethylene propylene styrene block copolymers, styrene butadiene styrene block copolymers, and combinations thereof.

In further aspects, the one or more polymers may include one or more polyamide copolymers (e.g., polyamide-polyether copolymers) and/or one or more polyurethanes (e.g., crosslinked polyurethanes and/or thermoplastic polyurethanes). Examples of suitable polyurethanes include those discussed below for barrier elements of the fluid-filled chamber 40. Alternatively, the one or more polymers may include one or more natural and/or synthetic rubbers, such as butadiene and isoprene.

When the resilient polymeric material is a foamed polymeric material, the foamed material may be foamed using a physical blowing agent which phase transitions to a gas based on a change in temperature and/or pressure, or a chemical blowing agent which forms a gas when heated above its activation temperature. For example, the chemical blowing agent may be an azo compound such as azodicarbonamide, sodium bicarbonate, and/or an isocyanate.

In some embodiments, the foamed polymeric material may be a crosslinked foamed material. In these embodiments, a peroxide-based crosslinking agent such as dicumyl peroxide may be used. Furthermore, the foamed polymeric material may include one or more fillers such as pigments, modified or natural clays, modified or unmodified synthetic clays, talc glass fiber, powdered glass, modified or natural silica, calcium carbonate, mica, paper, wood chips, and the like.

The resilient polymeric material may be formed using a molding process. In one example, when the resilient polymeric material is a molded elastomer, the uncured elastomer (e.g., rubber) may be mixed in a Banbury mixer with an optional filler and a curing package such as a sulfur-based or peroxide-based curing package, calendared, formed into shape, placed in a mold, and vulcanized.

In another example, when the resilient polymeric material is a foamed material, the material may be foamed during a molding process, such as an injection molding process. A thermoplastic polymeric material may be melted in the barrel of an injection molding system and combined with a physical or chemical blowing agent and optionally a crosslinking agent, and then injected into a mold under conditions which activate the blowing agent, forming a molded foam.

Optionally, when the resilient polymeric material is a foamed material, the foamed material may be a compression molded foam. Compression molding may be used to alter the physical properties (e.g., density, stiffness and/or durometer) of a foam, or to alter the physical appearance of the foam (e.g., to fuse two or more pieces of foam, to shape the foam, etc.), or both.

The compression molding process desirably starts by forming one or more foam preforms, such as by injection molding and foaming a polymeric material, by forming foamed particles or beads, by cutting foamed sheet stock, and the like. The compression molded foam may then be made by placing the one or more preforms formed of foamed polymeric material(s) in a compression mold, and applying sufficient pressure to the one or more preforms to compress the one or more preforms in a closed mold. Once the mold is closed, sufficient heat and/or pressure is applied to the one or more preforms in the closed mold for a sufficient duration of time to alter the preform(s) by forming a skin on the outer surface of the compression molded foam, fuse individual foam particles to each other, permanently increase the density of the foam(s), or any combination thereof. Following the heating and/or application of pressure, the mold is opened and the molded foam article is removed from the mold.

Figure 6:
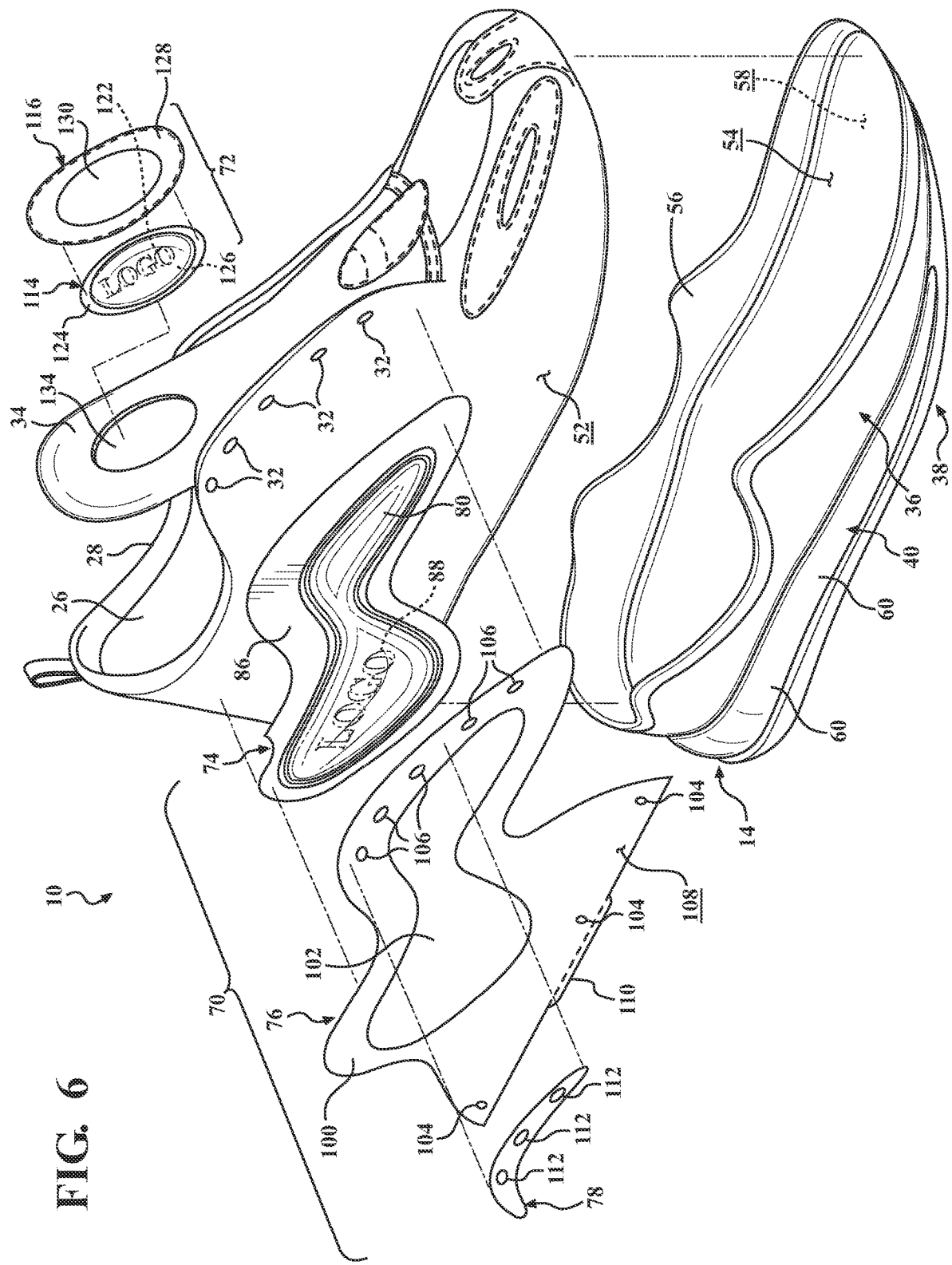
FIG. 6 is a top exploded view of the article of footwear of FIG. 1.

With particular reference to FIG. 6, the midsole 36 is shown as including an upper surface 54 that opposes the strobel 50 as well a peripheral lip 56 extending substantially continuously around an outer perimeter of the midsole 36. As shown in FIG. 1, the peripheral lip 56 extends in a direction toward the upper 12 and extends onto a portion of the upper surface 52 of the upper 12. In so doing, the peripheral lip 56 covers a junction of the upper 12 and the strobel 50 once the sole structure 14 is attached to the upper 12.

The midsole 36 additionally includes a bottom surface 58 that is shaped to matingly receive the fluid-filled chamber 40. Namely, the bottom surface 58 may include a shape that matingly receives a shape of the fluid-filled chamber 40 to ensure a secure attachment of the fluid-filled chamber 40 to the midsole 36. For example, the bottom surface 58 may include elongate recesses (neither shown) formed therein along the medial side 46 of the sole structure and the lateral side 48 of the sole structure and extending in a direction toward the upper 12. Additionally, the bottom surface 58 may include an arcuate recess (not shown) disposed along a heel region of the midsole 36 that extends in a direction of the upper 12, receives a portion of the fluid-filled chamber 40 therein, and is in fluid communication with the elongate recesses extending along the medial side 46 and the lateral side 48. In this configuration, the elongate recesses and arcuate recess may have a substantially concave shape that matingly receives the generally convex shape of portions of the fluid-filled chamber 40.

The fluid-filled chamber 40 is disposed generally between the midsole 36 and the outsole 38 and cooperates with the midsole 36 to attenuate ground-reacting forces associated with use of the article of footwear 10. The fluid-filled chamber 40 may include a first barrier element 60 and a second barrier element 62. The first barrier element 60 and the second barrier element 62 may be formed from a sheet of thermoplastic polyurethane (TPU). Specifically, the first barrier element 60 may be formed from a sheet of TPU material and the second barrier element 62 may likewise be formed from a sheet of TPU material that are formed into the configuration shown in FIGS. 1-3 and 6 to define an interior void 64. The first barrier element 60 may be joined to the second barrier element 62 by applying heat and pressure at a perimeter of the first barrier element 60 and the second barrier element 62 to define a peripheral seam (not shown). The peripheral seam seals the internal interior void 64, thereby defining a volume of the fluid-filled chamber 40.

As used herein, the term "barrier element" (e.g., barrier elements 60, 62) encompasses both monolayer and multilayer films. In some embodiments, one or both of barrier elements 60, 62 is produced (e.g., thermoformed or blow molded) from a monolayer film (a single layer). In other embodiments, one or both of barrier elements 60, 62 is produced (e.g., thermoformed or blow molded) from a multilayer film (multiple sublayers). In either aspect, each layer or sublayer can have a film thickness ranging from about 0.2 micrometers to about 1 millimeter. In further embodiments, the film thickness for each layer or sublayer can range from about 0.5 micrometers to about 500 micrometers. In yet further embodiments, the film thickness for each layer or sublayer can range from about 1 micrometer to about 100 micrometers.

One or both of barrier elements 60, 62 can independently be transparent, translucent, and/or opaque. For example, the first barrier element 60 may be transparent, while the second barrier element 62 is opaque. As used herein, the term "transparent" for a barrier element and/or a fluid-filled chamber means that light passes through the barrier element in substantially straight lines and a viewer can see through the barrier element. In comparison, for an opaque barrier element, light does not pass through the barrier element and one cannot see clearly through the barrier element at all. A translucent barrier element falls between a transparent barrier element and an opaque barrier element, in that light passes through a translucent element but some of the light is scattered so that a viewer cannot see clearly through the element.

The barrier elements 60, 62 can each be produced from an elastomeric material that includes one or more thermoplastic polymers and/or one or more cross-linkable polymers. In an aspect, the elastomeric material can include one or more thermoplastic elastomeric materials, such as one or more thermoplastic polyurethane (TPU) copolymers, one or more ethylene-vinyl alcohol (EVOH) copolymers, and the like.

As used herein, "polyurethane" refers to a copolymer (including oligomers) that contains a urethane group (—N(C=O)O—). These polyurethanes can contain additional groups such as ester, ether, urea, allophanate, biuret, carbodiimide, oxazolidinyl, isocynaurate, uretdione, carbonate, and the like, in addition to urethane groups. In an aspect, one or more of the polyurethanes can be produced by polymerizing one or more isocyanates with one or more polyols to produce copolymer chains having (—N(C=O)O—) linkages.

Examples of suitable isocyanates for producing the polyurethane copolymer chains include diisocyanates, such as aromatic diisocyanates, aliphatic diisocyanates, and combinations thereof. Examples of suitable aromatic diisocyanates include toluene diisocyanate (TDI), TDI adducts with trimethyloylpropane (TMP), methylene diphenyl diisocyanate (MDI), xylene diisocyanate (XDI), tetramethylxylylene diisocyanate (TMXDI), hydrogenated xylene diisocyanate (HXDI), naphthalene 1,5-diisocyanate (NDI), 1,5-tetrahydronaphthalene diisocyanate, para-phenylene diisocyanate (PPDI), 3,3'-dimethyldiphenyl-4, 4'-diisocyanate (DDDI), 4,4'-dibenzyl diisocyanate (DBDI), 4-chloro-1,3-phenylene diisocyanate, and combinations thereof. In some embodiments, the copolymer chains are substantially free of aromatic groups.

In particular aspects, the polyurethane polymer chains are produced from diisocynates including HMDI, TDI, MDI, H12 aliphatics, and combinations thereof. In an aspect, the thermoplastic TPU can include polyester-based TPU, polyether-based TPU, polycaprolactone-based TPU, polycarbonate-based TPU, polysiloxane-based TPU, or combinations thereof.

In another aspect, the polymeric layer can be formed of one or more of the following: EVOH copolymers, poly (vinyl chloride), polyvinylidene polymers and copolymers (e.g., polyvinylidene chloride), polyamides (e.g., amorphous polyamides), amide-based copolymers, acrylonitrile polymers (e.g., acrylonitrile-methyl acrylate copolymers), polyethylene terephthalate, polyether imides, polyacrylic imides, and other polymeric materials known to have relatively low gas transmission rates. Blends of these materials as well as with the TPU copolymers described herein and optionally including combinations of polyimides and crystalline polymers, are also suitable.

The barrier elements 60, 62 may include two or more sublayers (multilayer film) such as shown in Mitchell et al., U.S. Pat. No. 5,713,141 and Mitchell et al., U.S. Pat. No. 5,952,065, the disclosures of which are incorporated by reference in their entirety. In embodiments where the barrier elements 60, 62 include two or more sublayers, examples of suitable multilayer films include microlayer films, such as those disclosed in Bonk et al., U.S. Pat. No. 6,582,786, which is incorporated by reference in its entirety. In further embodiments, barrier elements 60, 62 may each independently include alternating sublayers of one or more TPU copolymer materials and one or more EVOH copolymer materials, where the total number of sublayers in each of barrier elements 60, 62 includes at least four (4) sublayers, at least ten (10) sublayers, at least twenty (20) sublayers, at least forty (40) sublayers, and/or at least sixty (60) sublayers.

The fluid-filled chamber 40 can be produced from the barrier elements 60, 62 using any suitable technique, such as thermoforming (e.g. vacuum thermoforming), blow molding, extrusion, injection molding, vacuum molding, rotary molding, transfer molding, pressure forming, heat sealing, casting, low-pressure casting, spin casting, reaction injection molding, radio frequency (RF) welding, and the like. In an aspect, barrier elements 60, 62 can be produced by co-extrusion followed by vacuum thermoforming to produce an inflatable fluid-filled chamber, which can optionally include one or more valves (e.g., one way valves) that allows the fluid-filled chamber 40 to be filled with the fluid (e.g., gas).

The fluid-filled chamber 40 can be provided in a fluid-filled (e.g., as provided in footwear 10) or in an unfilled state. The chamber 40 can be filled to include any suitable fluid, such as a gas or liquid. In an aspect, the gas can include air, nitrogen ($N_2$), or any other suitable gas. In other aspects, the chamber 40 can alternatively include other media, such as pellets, beads, ground recycled material, and the like (e.g., foamed beads and/or rubber beads). The fluid provided to the chamber 40 can result in the chamber 40 being pressurized. Alternatively, the fluid provided to the chamber 40 can be at atmospheric pressure such that the chamber 40 are not pressurized but, rather, simply contain a volume of fluid at atmospheric pressure.

The chamber 40 desirably has a low gas transmission rate to preserve their retained gas pressure. In some embodiments, the chamber 40 has a gas transmission rate for nitrogen gas that is at least about ten (10) times lower than a nitrogen gas transmission rate for a butyl rubber layer of substantially the same dimensions. In an aspect, the chamber 40 has a nitrogen gas transmission rate of 15 cubic-centimeter/square-meteratmosphereday ($cm^3/m^2 \cdot atm \cdot day$) or less for an average film thickness of 500 micrometers (based on thicknesses of barrier elements 60, 62). In further aspects, the transmission rate is 10 $cm^3/m^2 \cdot atm \cdot day$ or less, 5 $cm^3/m^2 \cdot atm \cdot day$ or less, or 1 $cm^3/m^2 \cdot atm \cdot day$ or less.

In some implementations, the upper and lower barrier elements 60, 62 are formed by respective mold portions each defining various surfaces for forming depressions and pinched surfaces corresponding to locations where the peripheral seam is formed when the upper barrier element 60 and the lower barrier element 62 are joined and bonded together. In some implementations, adhesive bonding joins the upper barrier element 60 and the lower barrier element 62 to form a web area (not shown) and the peripheral seam. In other implementations, the upper barrier element 60 and the lower barrier element 62 are joined to form the web area and the peripheral seam by thermal bonding. In some examples, one or both of the barrier elements 60, 62 are heated to a temperature that facilitates shaping and melding. In some examples, the barrier elements 60, 62 are heated prior to being located between their respective molds. In other examples, the mold may be heated to raise the temperature of the barrier elements 60, 62. In some implementations, a molding process used to form the fluid-filled chamber 40 incorporates vacuum ports within mold portions to remove air such that the upper and lower barrier elements 60, 62 are drawn into contact with respective mold portions. In other implementations, fluids such as air may be injected into areas between the upper and lower barrier elements 60, 62 such that pressure increases cause the barrier elements 60, 62 to engage with surfaces of their respective mold portions. The fluid-filled chamber 40 may be identical in terms of the construction of the fluid-filled chamber 40 as well as how the fluid-filled chamber 40 is attached to the midsole 12 as the fluid-filled chamber and midsole of U.S. Ser. No. 16/037,979, the disclosure of which is hereby incorporated by reference in its entirety.

Figure 2:
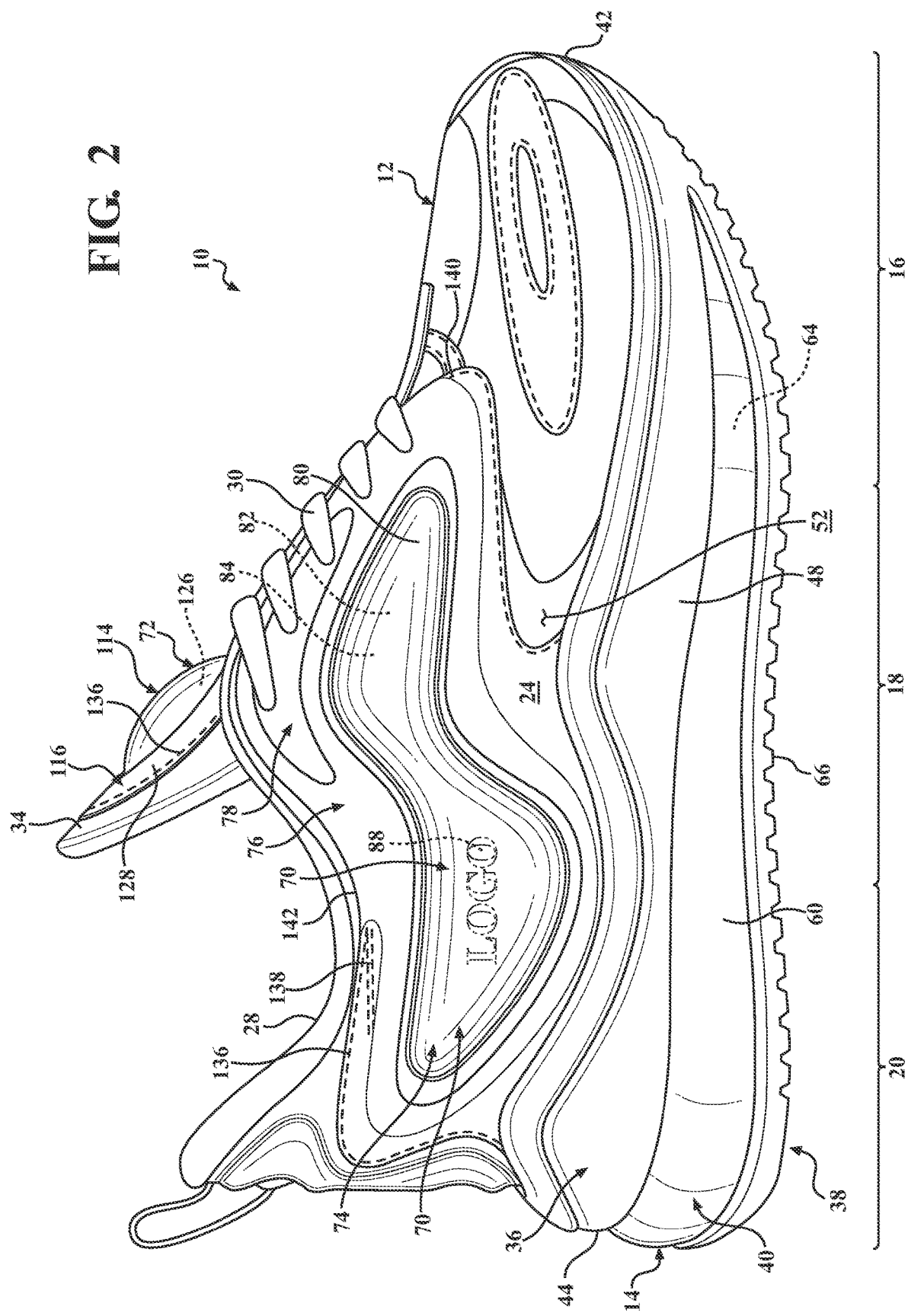
FIG. 2 is a lateral side view of the article of footwear of FIG. 1.
Figure 3:
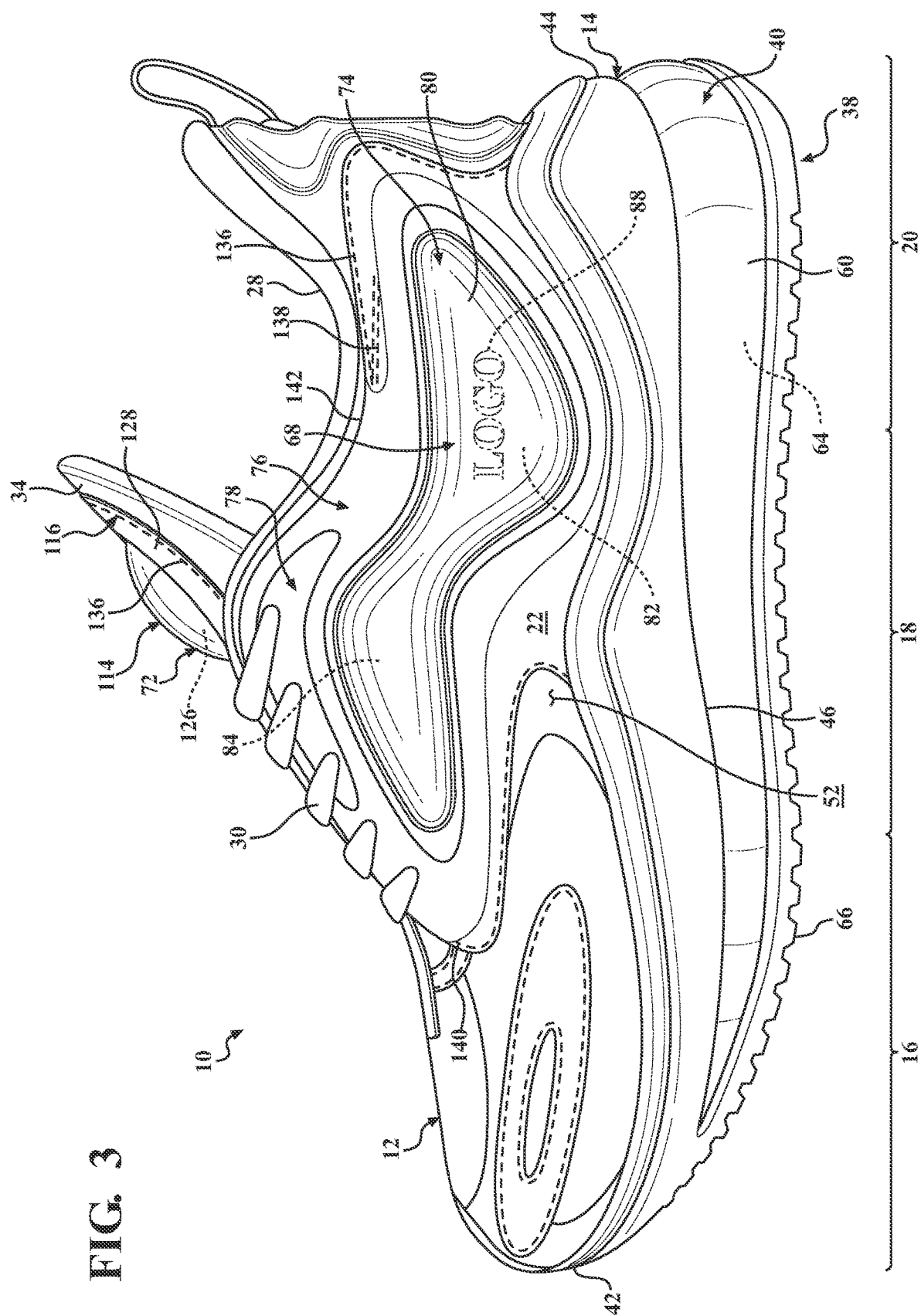
FIG. 3 is a medial side view of the article of footwear of FIG. 1.
Figure 4:
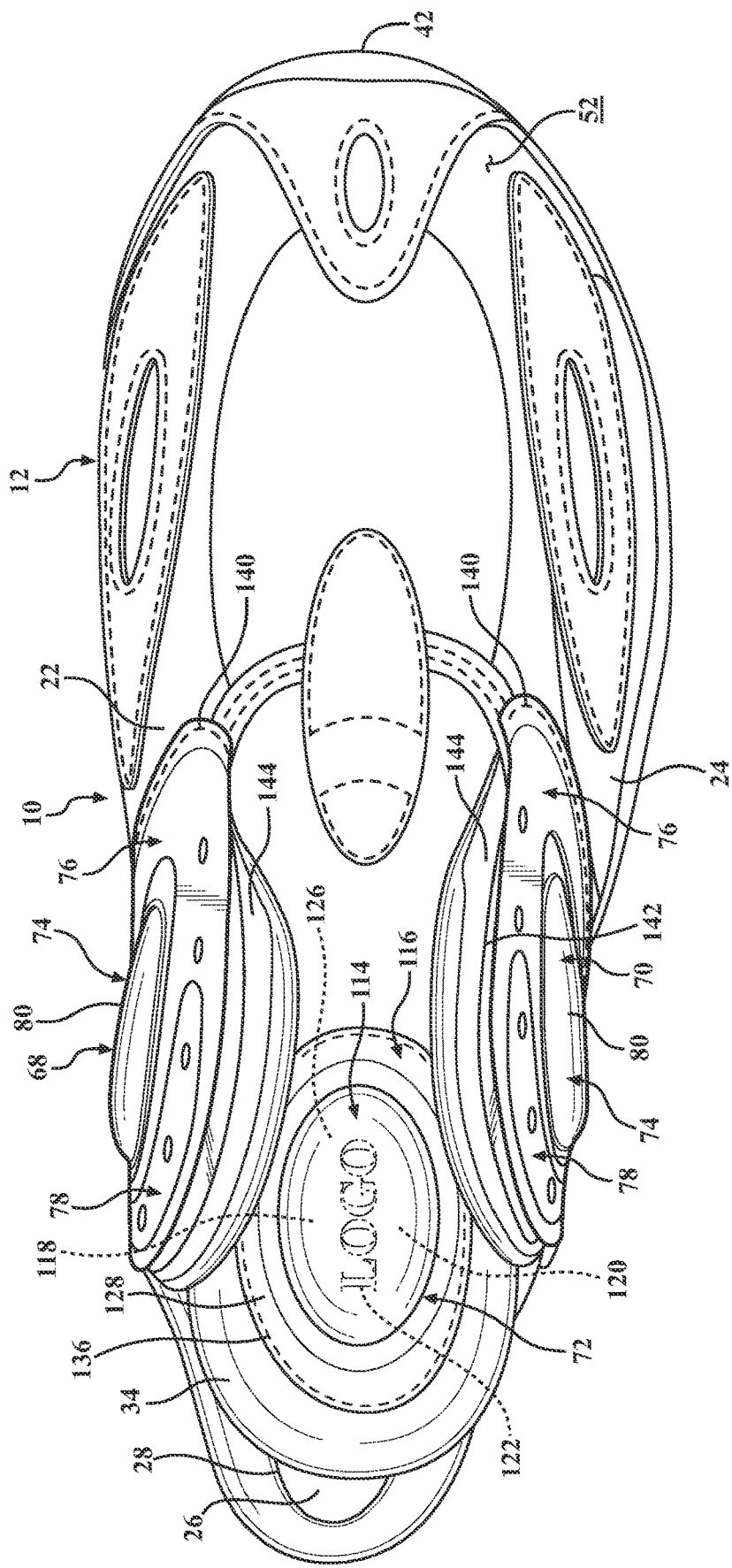
FIG. 4 is a top view of the article of footwear of FIG. 1 with laces removed.
Figure 5:
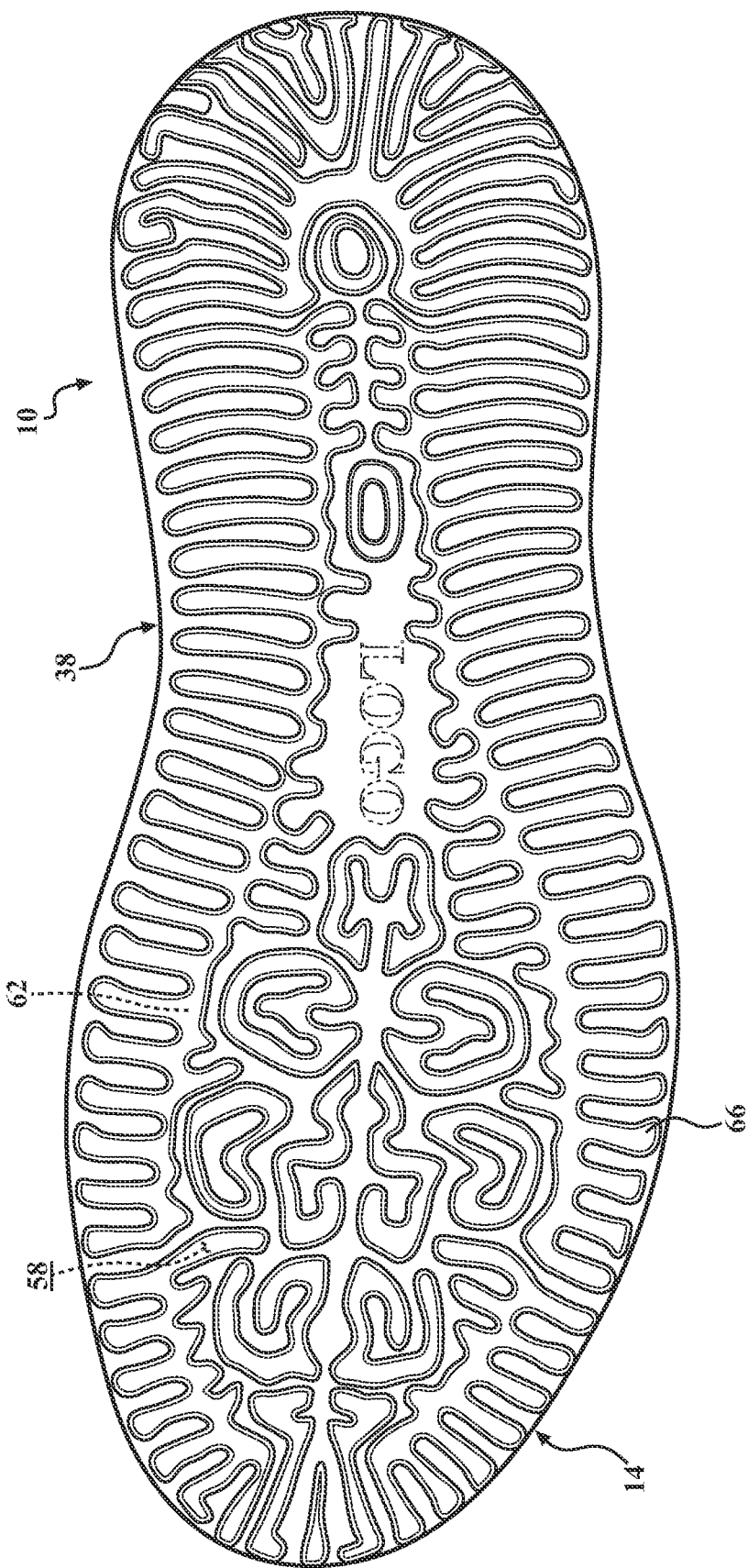
FIG. 5 is a bottom view of the article of footwear of FIG. 1.
Figure 7:
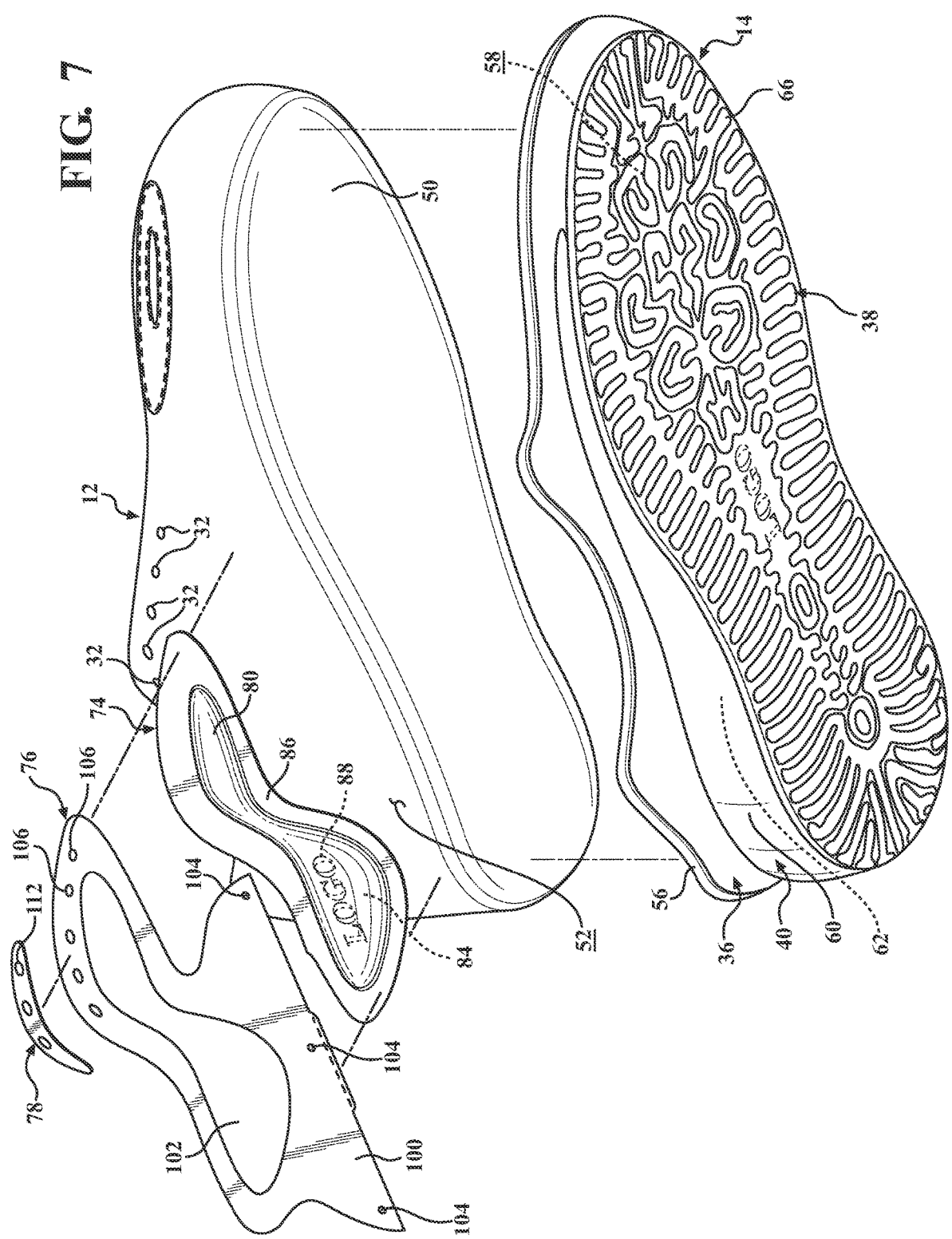
FIG. 7 is a bottom exploded view of the article of footwear of FIG. 1.
Figure 8:
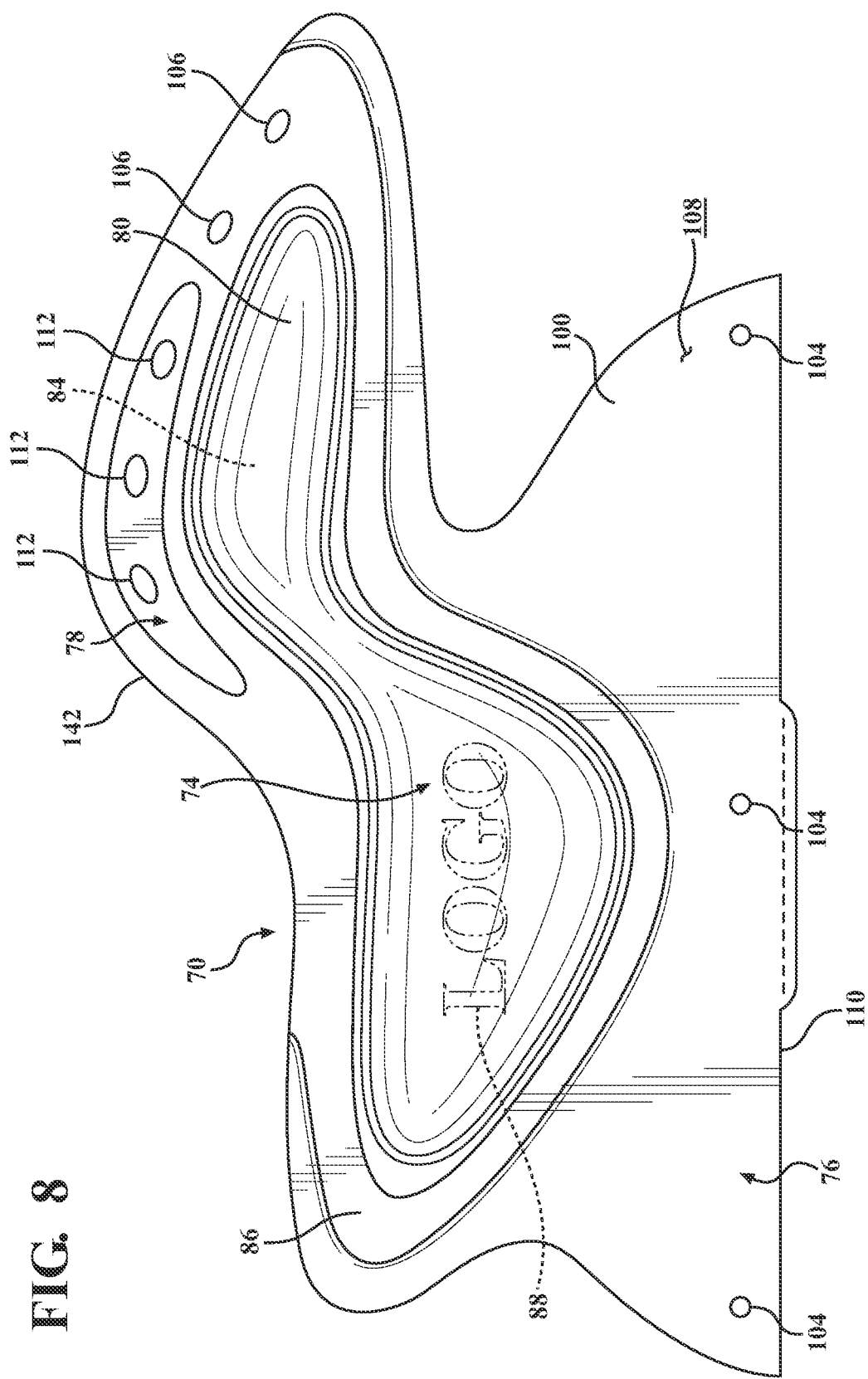
FIG. 8 is a side view of a bladder assembly for use with the article of footwear of FIG. 1.

With particular reference to FIGS. 6 and 7, the outsole 38 is shown as having a unitary construction extending from the anterior end 42 to the posterior end 44 and from the medial side 46 to the lateral side 48. The outsole 38 may be formed from a material that provides a degree of abrasion resistance and traction with a ground surface during use of the article of footwear 10. To that end, the outsole 38 may traction elements 66 to facilitate gripping a ground surface during use. In one configuration, the outsole 38 extends onto an outer surface of the fluid-filled chamber 40, as shown in FIGS. 1-3.

With particular reference to FIGS. 1-4, 6, and 7, the upper 12 extends from the anterior end 42 to the posterior end 44 and from the medial side 46 to the lateral side 48 and includes a bladder assembly 68 disposed at the medial side 22 of the upper 12, a bladder assembly 70 disposed at the lateral side 24 of the upper 12, and a bladder assembly 72 disposed at the tongue portion 34. As will be described below, the bladder assemblies 68, 70 cooperate to maintain the upper 12 in an upright state such that the ankle opening 28 is readily accessible. In a similar fashion, the bladder assembly 72 serves to maintain a desired shape of the tongue portion 34 to restrict deformation thereof. In so doing, the bladder assemblies 68, 70, 72 maintain a desired shape of the upper 12—including the tongue portion 34—to facilitate use of the article of footwear 10 by reducing the effort required to insert a wearer's foot into the interior void 26.

With particular reference to FIGS. 6 and 7, the bladder assemblies 68, 70 are shown as including a fluid-filled chamber 74, a flange or frame 76, and a reinforcement 78. The bladder assembles 68, 70 are disposed on opposite sides of the upper 12 and provide the upper 12 with the same configuration when viewed from the medial side 22 or the lateral side 24. Providing the upper 12 with the same configuration at the medial side 22 and the lateral side 24 is accomplished by providing the bladder assemblies 68, 70 as mirror images of one another. As such, if the bladder assembly 68 were aligned with the bladder assembly 70 such that bottom edges of each assembly 68, 70 were aligned with one another, the bladder assemblies 68, 70 would be symmetric about the aligned, bottom edges of each assembly 68, 70. Accordingly, the bladder assemblies 68, 70 include the same components other than the orientation of the components relative to the upper 12. As such, only one of the bladder assemblies 68, 70 will be described in detail below. Namely, the bladder assembly 70 disposed at the lateral side 24 of the upper 12 will be described in detail. The bladder assembly 68 disposed at the medial side 22 of the upper 12 will not be described in detail, as the bladder assembly 68 disposed at the medial side 22 is identical to the bladder assembly 70 disposed at the lateral side 24 aside from the orientation of the components of the bladder assembly 68. Accordingly, like reference numerals will be used hereinafter and in the drawings to identify like components of the bladder assembly 70 relative to the bladder assembly 68.

The fluid-filled chamber 74 includes a first barrier element 80 and a second barrier element 82 that cooperate to define an interior void 84. Namely, the first barrier element 80 may be attached to the second barrier element 82 at a peripheral seam 86 to seal the interior void 84. In so doing, a volume of fluid such as the fluids described above with respect to the fluid-filled chamber 40 may be contained within the interior void 84 between the first barrier element 80 and the second barrier element 82. Accordingly, the fluid-filled chamber 74 may be formed in an identical process and may be formed from identical materials described above with respect to the fluid-filled chamber 40. The only difference between the fluid-filled chamber 74 and the fluid-filled chamber 40 may be the pressure of the fluid contained within the interior void 84 of the fluid-filled chamber 74 as compared to the interior void 64 of the fluid-filled chamber 40. For example, the fluid-filled chamber 40 is an underfoot chamber and, as such, may contain a fluid at higher pressure than the interior void 84 of the fluid-filled chamber 74. For example, the pressure of the fluid-filled chamber 40 may be between 15-20 psi while the pressure of the fluid-filled chamber 74 disposed at the medial side 22 and the lateral side 24 of the upper 12 may be between 3-4 psi.

In addition to the fluid-filled chamber 74 being at a different pressure than the fluid-filled chamber 40, the fluid-filled chamber 74 may include a different appearance than the fluid-filled chamber 40. For example, while the first barrier element 80 may be formed from an identical material as the barrier elements 60, 62 described above with respect to the fluid-filled chamber 40 such that the first barrier element 80 is transparent, the second barrier element 82 may include a coating and/or layer that causes the second barrier element 82 to be translucent or opaque. Further, the second barrier element 82 may additionally or alternatively include a graphic or logo 88 printed thereon. The graphic 88 may be printed on a surface of the barrier element 82 that opposes the first barrier element 80 or, alternatively, may be printed on a surface of the second barrier element 82 that opposes the upper 12. Regardless of where the graphic 88 is printed on the second barrier element 82, the graphic 88 may be viewed at an outer surface of the fluid-filled chamber 74 and, thus, at an outer surface of the upper 12, through the first barrier element 80.

While the second barrier element 82 is described as being translucent or opaque, the second barrier element 82 could be formed from an identical material as the first barrier element 80 and, thus, the second barrier element 82 may likewise be transparent. Accordingly, and as will be described in greater detail below, the upper 12 may be visible through the first barrier element 80 and the second barrier element 82 at the fluid-filled chamber 74. In this configuration, the second barrier element 82 may include a graphic 88 printed thereon in an identical fashion as described above with respect to printing the graphic 88 on the second barrier element 82 when the second barrier element 82 is translucent or opaque. As with the translucent or opaque second barrier element 82, the graphic 88 is visible at an outer surface of the upper 12 via the first barrier element 80. In this configuration, however, not only is the graphic 88 visible at the outer surface of the upper via the first barrier element 80, the outer surface 52 of the upper 12 is likewise visible at the fluid-filled chamber 74 via the transparent first barrier element 80 and second barrier element 82.

Figure 9:
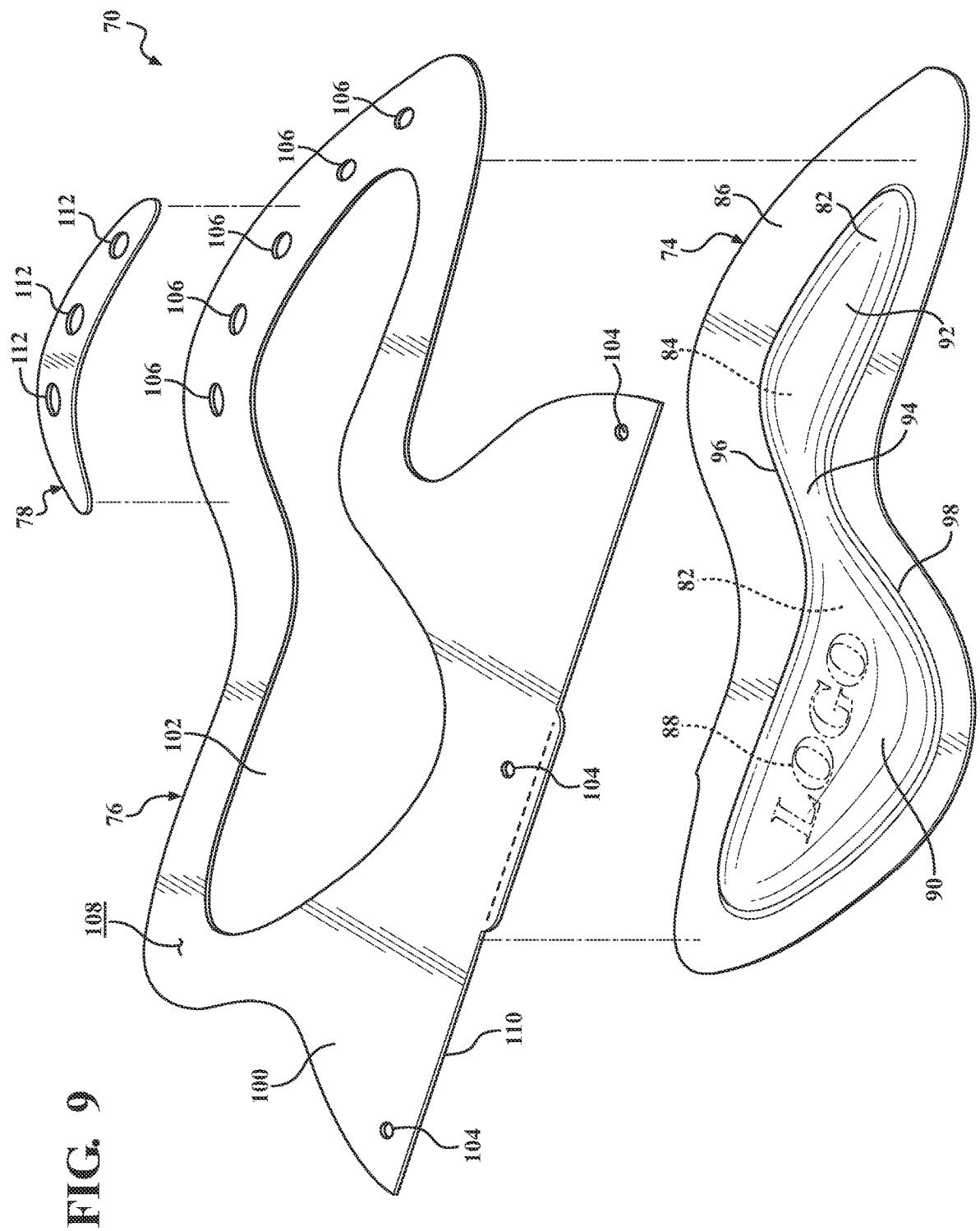
FIG. 9 is an exploded view of the bladder assembly of FIG. 8.
Figure 10:
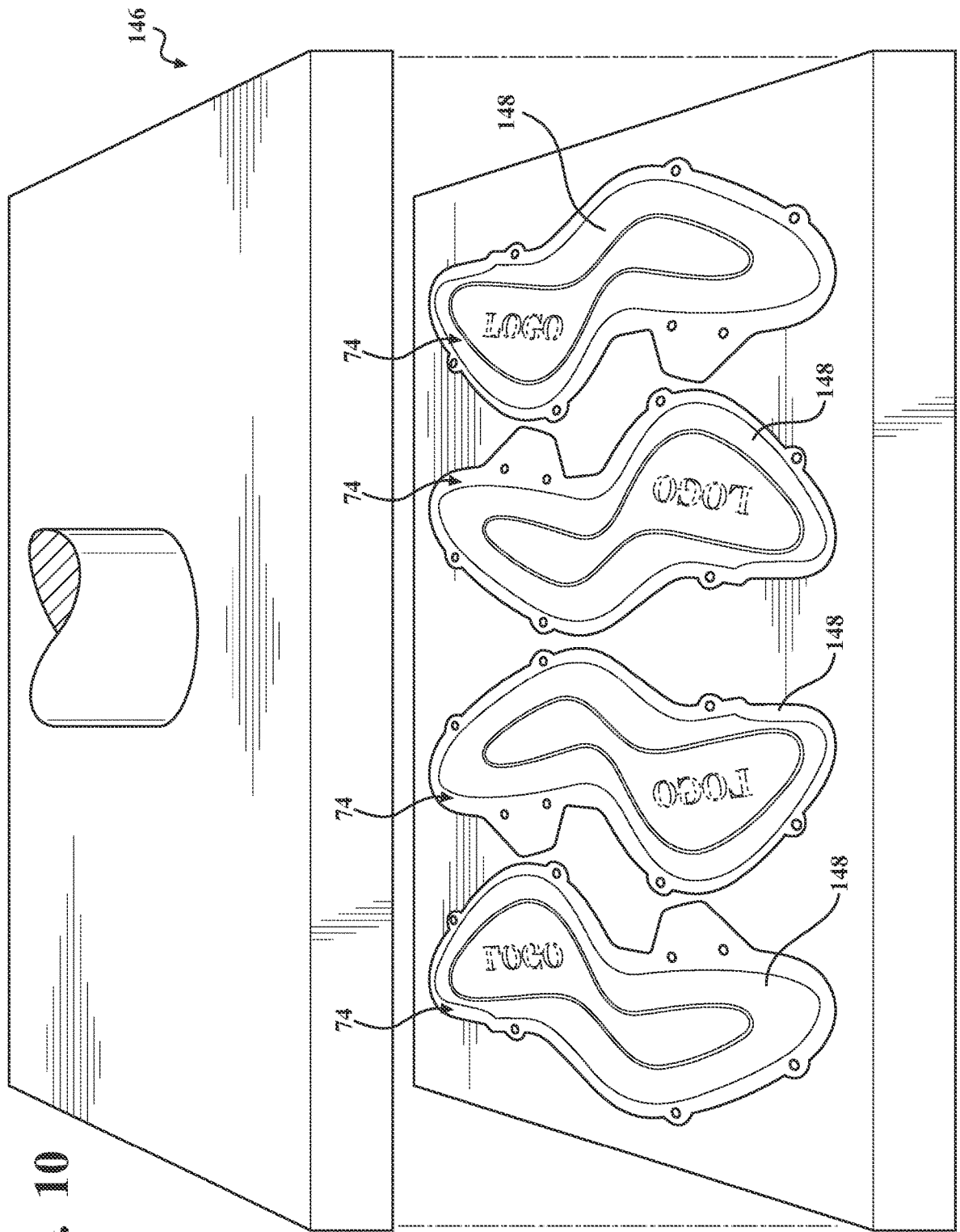
FIG. 10 is a perspective view of a mold shown in an open state for use in making a fluid-filled chamber for use in the bladder assembly of FIG. 8.

With particular reference to FIG. 9, the shape of the fluid-filled chamber 74 provides the upper 12 with a degree of stiffness such that the ankle opening 28 maintains a desired shape. Namely, the fluid-filled chambers 74 respectively associated with the bladder assembly 68 disposed at the medial side 22 and the bladder assembly 70 disposed at the lateral side 24 cooperate to bias a portion of the upper 12 disposed at a medial side 22 of the ankle opening 28 away from a portion of the upper 12 at the lateral side 24 of the ankle opening 28 to facilitate entry and removal of a wearer's foot into and from the interior void 26 via the ankle opening 28. As will be described in greater detail below, the shape of the fluid-filled chambers 74 and the pressure of the fluid contained therein provides the upper 12 with this degree of stiffness and allows the chambers 74 to act as biasing elements that bias opposing sides of the ankle opening 28 away from one another.

As shown in FIG. 9, the generally elongate shape of the fluid-filled chamber 74 is defined by a first chamber portion 90, a second chamber portion 92, and a third chamber portion 94 disposed generally between the first chamber portion 90 and the second chamber portion 92. As shown in FIG. 9, the first chamber portion 90 and the second chamber portion 92 are both larger than the third chamber portion 94. Accordingly, because the third chamber portion 94 is disposed between the first chamber portion 90 and the second chamber portion 92 along a longitudinal axis of the fluid-filled chamber 74, the third chamber portion 94 serves as an articulation point of the fluid-filled chamber 74. Specifically, the reduced volume of the third chamber portion 94 likewise results in a cross-sectional area of the third chamber portion 94 being reduced relative to a cross-sectional area of the first chamber portion 90 and the second chamber portion 92. Accordingly, the reduced area of the third chamber portion 94 provides the fluid-filled chamber 74 with an articulation point which, in turn, provides the mechanical effect of adding stiffness at a perimeter of the fluid-filled chamber 74.

The added stiffness provided by the third chamber portion 94 is caused at least in part by an upper edge 96 and a lower edge 98 that extend along the first chamber portion 90, the second chamber portion 92, and the third chamber portion 94 on opposite sides of the fluid-filled chamber 74. The upper edge 96 and the lower edge 98 have an effective length that is longer than an upper edge and a lower edge of a chamber having a single chamber portion including a constant cross-sectional area due to the reduced cross-sectional area of the third chamber portion 94. Namely, as the upper edge 96 and the lower edge 98 extend along the first chamber portion 90 and the second chamber portion 92, the upper edge 96 and the lower edge 98 are required to extend in a direction toward one another at the third chamber portion 94 due to the reduced cross-sectional area of the third chamber portion 94. Accordingly, the effective length of the upper edge 96 and the lower edge 98 is increased.

The upper edge 96 and the lower edge 98 are formed by a portion of the peripheral seam 86 disposed adjacent to the interior void 84. Namely, the upper edge 96 and the lower edge 98 are formed by joining a material of the first barrier element 80 and a material of the second barrier element 82 proximate to the interior void 84 of the fluid-filled chamber 74. In so doing, the peripheral seam 86 includes a greater stiffness than the individual first barrier element 80 and the second barrier element 82 and, as such, provides the fluid-filled chamber 74 with a degree of stiffness around a perimeter of the interior void 84. Increasing the effective lengths of the upper edge 96 and the lower edge 98 further increases the overall stiffness of the fluid-filled chamber 74 and, as such, has the mechanical effect of thereby stiffening a portion of the upper 12 at a location of the bladder assemblies 68, 70.

As described, the fluid-filled chamber 74 is formed from a first barrier element 80 and a second barrier element 82 having a material that may be identical to the materials described above with respect to the fluid-filled chamber 40. Accordingly, the first barrier element 80 and the second barrier element 82 may be formed from a TPU material, which is relatively flexible and pliable. While the peripheral seam 86 joins the material of the first barrier element 80 and the material of the second barrier element 82 and, as such, provides the fluid-filled chamber 74 with a degree of stiffness, the flange 76 may be attached to the fluid-filled chamber 74 at the peripheral seam 86 to further provide the fluid-filled chamber 74 with increased rigidity.

The frame 86 may be formed from a different material than the material of the first barrier element 80 and the second barrier element 82 in an effort to provide a degree of stiffness to the bladder assemblies 68, 70. For example, the frame may be formed from a polyurethane (PU) material that is infused with a reinforcement textile. For example, the frame 76 may be formed from a layer of PU that is attached to a reinforcement textile via a hot melt material. Namely, the PU material of the frame 76 may be attached to the TPU material of the first barrier element 80 via a hot melt adhesive. The textile associated with the flange 76 may be attached to an opposite side of the fluid-filled chamber 74 than the PU material and, as such, may be attached to the material of the second barrier element 82 via a hot melt adhesive. In this regard, the peripheral seam 86 is disposed generally between the PU material of the frame 76 and the reinforcement textile of the flange 76 via a hot melt adhesive.

As shown in FIG. 9, the flange 76 includes a shape that is similar to a shape of the fluid-filled chamber 74 but is larger than the peripheral seam 86. Accordingly, while the PU material of the frame 76 is attached to the material of the first barrier element 80 and the reinforcement textile is attached to the material of the second barrier element 82 at the peripheral seam 86, the PU material of the frame 76 is attached to the reinforcement textile of the frame 76 via the hot melt adhesive in an area that is spaced apart from an outer periphery of the fluid-filled chamber 74 at the peripheral seam 86. Accordingly, the peripheral seam 86 is hidden from view by the joined PU material and the reinforcement textile at an outer edge of the peripheral seam 86. In other words, the joined PU material and the reinforcement textile of the frame 76 fully surrounds and encapsulates the peripheral seam 86 at its outer edge, thereby preventing the outer edge of the peripheral seam 86 from being viewed at the outer surface 52 of the upper 12.

As shown in FIG. 9, the frame 76 includes a main body 100 defining a chamber aperture 102, attachment apertures 104, and fastener apertures 106. The chamber aperture 102 includes a shape that is similar to a shape of the first chamber portion 90, the second chamber portion 92, and third chamber portion 94. The shape of the chamber aperture 102 defined by the main body 100 allows the first chamber portion 90, the second chamber portion 92, and the third chamber portion 94 to extend from an outer surface 108 of the main body 100 when the interior void 84 is pressurized. Accordingly, the chamber aperture 102 includes a shape that is virtually identical to the combined shape of the first chamber portion 90, the second chamber portion 92, and the third chamber portion 94 but is sized to accommodate the first chamber portion 90, the second chamber portion 92, and the third chamber portion 94 extending therethrough once pressurized.

The attachment apertures 104 are disposed proximate to a bottom edge 110 of the main body 100 and extend through a thickness of the main body 100. The attachment apertures 104 are spaced apart from one another along the bottom edge 110 and serve to help attach the frame 76 and, thus, the fluid-filled chamber 74, to the upper 12, as will be described in greater detail below.

The fastener apertures 106 are formed through a thickness of the main body 100 on an opposite side of the chamber aperture 102 than the attachment apertures 104. The fastener apertures 106 are aligned with the apertures 32 of the upper 12 when the frame 76 is attached to the upper 12 to allow the fasteners 30 to extend through the apertures 32 of the upper and through the fastener apertures 106 of the frame 76.

The reinforcement 78 is attached to the main body 100 of the frame 76 proximate to the fastener apertures 106. Specifically, the reinforcement 78 includes a series of fastener apertures 106 that are aligned with some of the fastener apertures 106 of the main body 100. Accordingly, when the reinforcement 78 is attached to the main body 100 and the fastener apertures 112 of the reinforcement 78 are aligned with respective fastener apertures 106 of the main body 100, the fastener apertures 112 of the reinforcement 78 are likewise aligned with respective apertures 32 of the upper 12. Accordingly, where the fastener apertures 112 are aligned with the fastener apertures 106 of the main body 100, a fastener 30 inserted into an aperture 32 of the upper 12 is likewise inserted into and received by the fastener apertures 106 of the main body 100 and the fastener apertures 112 of the reinforcement 78.

The reinforcement 78 may be formed from a different material than a material of the flange 76 and/or the fluid-filled chamber 74. Alternatively, the reinforcement 78 may be formed from a similar or the same material as the frame 76 or the fluid-filled chamber 74 but includes a greater thickness than the frame 76 or the peripheral seam 86 of the fluid-filled chamber 74. Regardless of the material used to form the reinforcement 78 and the thickness of the reinforcement 78, the reinforcement 78 is attached to the main body 100 proximate to the fastener apertures 106 to reinforce the fastener apertures 106. Accordingly, the reinforcement 78 may include a greater stiffness than a material forming the frame 76.

With particular reference to FIG. 6, the bladder assembly 72 is shown as including a fluid-filled chamber 114 and a flange or frame 116. As with the bladder assemblies 68, 70, the bladder assembly 72 may be formed from a first barrier element 118 and a second barrier element 120. The first barrier element 118 and the second barrier element 120 may be identical to the first barrier element 80 and the second barrier element 82, respectively, of the fluid-filled chamber 74 in terms of both material, material properties, and methods of forming the fluid-filled chamber 114. For example, the first barrier element 118 may be transparent while the second barrier element 120 may be transparent, translucent, or opaque. Further, as with the second barrier element 82 of the fluid-filled chamber 74, the second barrier element 120 may include a graphic 122 that is visible through the first barrier element 118. As with the fluid-filled chamber 74, the fluid-filled chamber 114 may be formed via the methods described above with respect to the fluid-filled chamber 40 and may be formed from the materials discussed above with respect to the fluid-filled chamber 40.

The first barrier element 118 and the second barrier element 120 may be formed into a substantially oval shape and may be attached to one another at a peripheral seam 124. Once the first barrier element 118 and the second barrier element 120 are attached to one another at the peripheral seam 124, an interior void 126 of the fluid-filled chamber 114 is defined. The interior void 126 may receive a pressurized fluid in a similar fashion as the interior void 84 of the fluid-filled chamber 74. As with the fluid-filled chamber 74, the interior void 126 of the fluid-filled chamber 114 may receive any of the fluids described with respect to the fluid-filled chamber 40. Further, the pressure of the fluid-filled chamber 14 within the interior void 126 may be substantially similar to the pressure of the fluid-filled chambers 74. Accordingly, the pressure of the fluid-filled chamber 114 may be less than the pressure of the fluid-filled chamber 40 in a similar fashion as the fluid-filled chamber 74.

The frame 116 includes a similar shape as the fluid-filled chamber 114. Specifically, the frame 116 includes a main body 128 having an aperture 130 formed there through. The aperture 130 includes a shape that is similar to a shape of the first barrier element 118 defining the interior void 126. Specifically, the fluid-filled chamber 114 includes a chamber portion 132 defined by the first barrier element 118, whereby the chamber portion 132 cooperates with a portion of the second barrier element 120 to define the interior void 126. The chamber portion 132 includes a substantially convex outer surface that protrudes from the main body 128 of the frame 116 at the aperture 130. As shown in FIG. 6, each of the chamber portion 132 of the fluid-filled chamber 114 and the aperture 130 of the frame 116 includes a substantially oval shape. While the chamber portion 132 and the aperture 130 are described and shown as including an oval shape, these elements could include any shape including, but not limited to, a circle, square, or rectangle.

The frame 116 includes an identical construction as the frame 76 of the bladder assemblies 68, 70 in terms of material and material properties. For example, the frame 116 includes a PU portion that forms an outer surface of the tongue portion 34 when the bladder assembly 72 is attached to the tongue portion 34 and includes a reinforcement textile attached to the PU layer. The reinforcement textile is attached to the second barrier element 120 in an area between the second barrier element 120 and an outer surface of the tongue portion 34. Specifically, the reinforcement textile is attached to the second barrier element 120 at the peripheral seam 124 and, as such, is disposed between the second barrier element 120 at the peripheral seam 124 and the outer surface of the tongue portion 34 when the bladder assembly 72 is attached to the tongue portion 34.

As described above with respect to the frame 76 and fluid-filled chamber 74, the frame 116 of the bladder assembly 72 includes the PU layer attached to the first barrier element 118 at the peripheral seam 124 and the reinforcement textile attached to the second barrier element 120 at the peripheral seam 124. Additionally, the frame 116 is larger than the peripheral seam 124 and, as such, extends beyond an outer perimeter edge of the peripheral seam 124. In this region, the PU layer is bonded directly to the reinforcement textile such that the peripheral seam 124 is hidden from view at its peripheral edge. The construction of the frame 116 at the peripheral seam 124 and in the area outside of the perimeter of the peripheral seam 124 is identical to the construction of the frame 76 in the area of the peripheral seam 86 of the fluid-filled chamber 74 and in an area outside of the peripheral seam 86. As such, the PU layer is attached to the first barrier element 118 via a hot melt adhesive while the reinforcement textile is attached is the second barrier element 120 via a hot melt adhesive. Similarly, in the PU layer is attached to the reinforcement textile in an area outside of the peripheral seam 124 via a hot melt adhesive disposed between the PU layer and the reinforcement textile.

The bladder assembly 72 may be received by an aperture 134 formed in the tongue portion 34, as shown in FIG. 6. The aperture 134 formed in through the tongue portion 34 includes a similar shape as the fluid-filled chamber 114 and the frame 116. As such, the aperture 134 includes a substantially oval shape that accommodates the substantially oval shape of the fluid-filled chamber 114. Because the aperture 134 is formed through the thickness of the tongue portion 34, the interior void 126 of the upper 12 may be visible through the tongue portion 34 via the first barrier element 118 and the second barrier element 120 of the fluid-filled chamber 114 when the second barrier element 120 is formed from a transparent material.

With particular reference to FIGS. 1 through 4, the bladder assemblies 68, 70, 72 are shown as being attached to various portions of the upper 12. Namely, the bladder assembly 68 is attached to the medial side 22 of the upper 12, the bladder assembly 70 is attached to the lateral side 24 of the upper 12, and the bladder assembly 72 is attached to the tongue portion 34 of the upper 12. Each of the bladder assemblies 68, 70, 72 may be attached to the various portions of the upper 12 via stitching 136 and/or by a suitable adhesive. Additionally or alternatively, a portion of the bladder assemblies 68, 70, 72 may be heated to a sufficient temperature to cause a portion of the frames 76, 116 to flow and meld with a material of the upper 12. While the bladder assemblies 68, 70, 72 may be attached to the various regions of the upper 12 via any of the foregoing methods, the bladder assemblies 68, 70, 72 will be described and shown hereinafter as being attached to the upper 12 via stitching 136.

With particular reference to FIGS. 1 and 2, the bladder assembly 70 is shown as being attached to the upper 12 at the lateral side 24 via stitching 136. Specifically, the stitching 136 is inserted through the material of the frame 116 and engages the material of the upper 112 such that the bladder assembly 70 opposes and is in contact with the outer surface 52 of the upper 12. The stitching 136 extends from a first end 138 disposed proximate to the ankle opening 28 and extends continuously from the first end 138 to a second end 140 disposed proximate to a base of the tongue portion 34, as best shown in FIG. 1. Specifically, the stitching 136 extends continuously from the first end 138 around an outer perimeter of the frame 76, along the bottom edge 110 until terminating at the second end 140. As such, an upper, peripheral edge 142 of the frame 76 is movable relative to the material forming the upper 12 in an area between the base of the tongue portion 34 and the ankle opening 28.

A gap 144 (FIG. 4) is formed between the outer surface 52 of the upper 12 and the bladder assembly 70 at the medial side 22. The gap 144 permits access in an area between the bladder assembly 70 and the outer surface 52 of the upper 12 and permits relative movement between these elements such that the bladder assembly 70 may be selectively moved toward and away from the outer surface 52 of the upper 12. Likewise, the upper 12 may be selectively moved toward and away from the bladder assembly 70 in the region of the peripheral edge 142 and gap 144.

As described above, the fluid-filled chamber 74 may be formed from barrier elements 80, 82 that are transparent. Accordingly, the outer surface 52 of the upper 12 may be visible through the barrier elements 80, 82 at the medial side 22. If the second barrier element 82 is formed from a translucent material, the translucent material may cooperate with the outer surface 52 of the upper 12 to provide a desired appearance (i.e., color) at the medial side 22, as viewed through the first barrier element 80. As described above, the bladder assembly 68 attached to the upper 12 at the medial side 22 mirrors the bladder assembly 70 disposed at the lateral side 24. The bladder assembly 68 is otherwise identical to the bladder assembly 70 and is attached to the upper 12 in an identical fashion as the bladder assembly 70. Accordingly, a detailed description of the bladder assembly 68 and its attachment to the upper 12 is foregone.

The bladder assembly 72 is attached to the tongue portion 34 of the upper 12 via stitching 136. The stitching 136 extends through the frame 116 and surrounds an entire perimeter of the frame 116, as best shown in FIG. 1.

In operation, the fluid-filled chambers 74 respectively associated with the bladder assemblies 68, 70, serve to provide the upper 12 with a degree of rigidity. Namely, the fluid-filled chambers 74 and frames 76 cause the material of the upper 12 forming the ankle opening 28 at the medial side 22 to move in a direction away from the material forming the ankle opening 28 at the lateral side 24. The fluid-filled chambers 74 and frames 76 likewise cause the material of the upper 12 forming at the ankle opening 28 at both the medial side 22 and the lateral side 24 to move in a direction away from the outsole 38. In so doing, the fluid-filled chambers 74 and the frames 76 of the bladder assemblies 68, 70, exert a force on the material forming the upper 12 at the medial side 22 and the lateral side 24 to maintain the ankle opening 28 in a substantially open state. Likewise, the fluid-filled chamber 114 associated with the bladder assembly 72 biases the tongue portion 34 into an extended state, thereby strengthening the tongue portion 34 and increasing the force required to bend the tongue portion 34.

The forces exerted on the medial side 22 and the lateral side 24 via the bladder assemblies 68, 70, respectively, as well as the forces exerted on the tongue portion 34 via the bladder assembly 72, is created by providing the fluid-filled chambers 74, 114 with a somewhat rigid frame or flange 76, 116, respectively. The rigid nature of these elements 76, 116 causes the material of the upper 12 in the areas of the bladder assemblies 68, 70, 72 to be placed in tension which, in turn, helps maintain an opening to the interior void 26 of the upper 12 at the ankle opening 28. For example, the bladder assemblies 68, 70, respectively disposed at the medial side 22 and the lateral side 24 of the upper 12 cause the material of the upper 12 forming the ankle opening 28 to move in a direction away from one another. Specifically, a material forming the ankle opening 28 at the medial side 28 moves in a direction away from the material of the upper 12 forming the ankle opening 28 at the lateral side 24 and a material of the upper 12 forming the ankle opening 28 at the lateral side 24 moves in a direction away from the material of the upper 12 forming the ankle opening 28 at the medial side 22. In so doing, the ankle opening 28 is maintained in an open state, thereby facilitating insertion and removal of a wearer's foot into and out of the interior void 26 of the upper 12.

With particular reference to FIGS. 10 through 14, a method of forming the bladder assemblies 68, 70, will be described in detail. While the method will be described in conjunction with forming the bladder assemblies 68, 70, an identical method may be used to form the bladder assembly 72.

Figure 11:
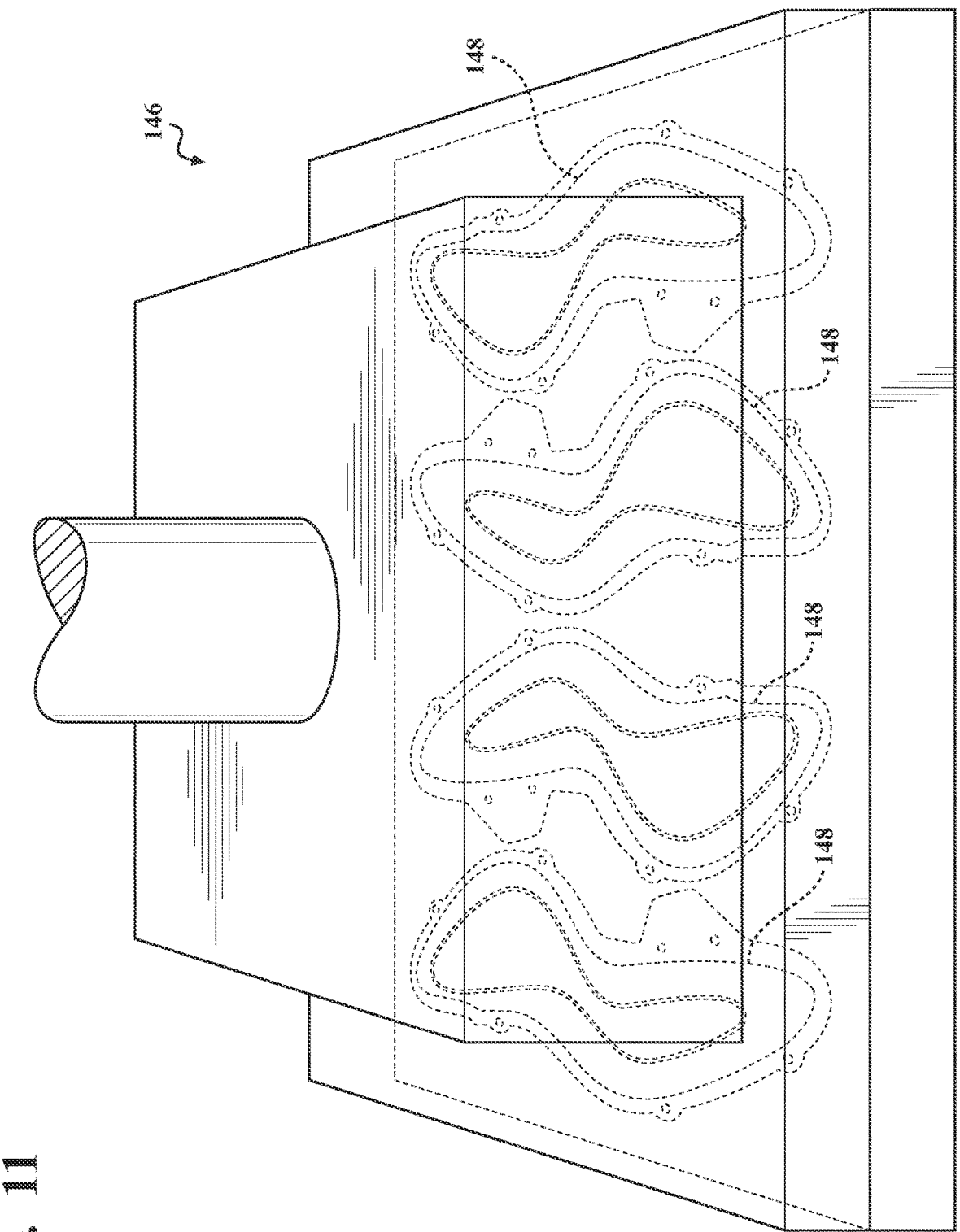
FIG. 11 is a perspective view of the mold of FIG. 10 shown in a closed state and forming a fluid-filled chamber for use in the bladder assembly of FIG. 8.

In a first step, a mold 146 may be moved into an open state to expose a one or more cavities 148. At this point, a first sheet of TPU material and a second sheet of TPU material respectively forming the first barrier element 80 and the second barrier element 82 may be inserted into the mold 146. Once the TPU sheets are inserted into the mold 146, the mold 146 may be moved into a closed state, as shown in FIG. 11. In this position, heat and/or pressure may be applied to the TPU sheets within the mold 146 at the peripheral seam 86. In so doing, the fluid-filled chamber 74 may be formed for later use in forming the completed bladder assemblies 68, 70. The fluid-filled chambers 74 may then be filled with fluid at a desired pressure either within the mold 146 or after removal of the fluid-filled chambers 74 from the mold 146.

Figure 12:
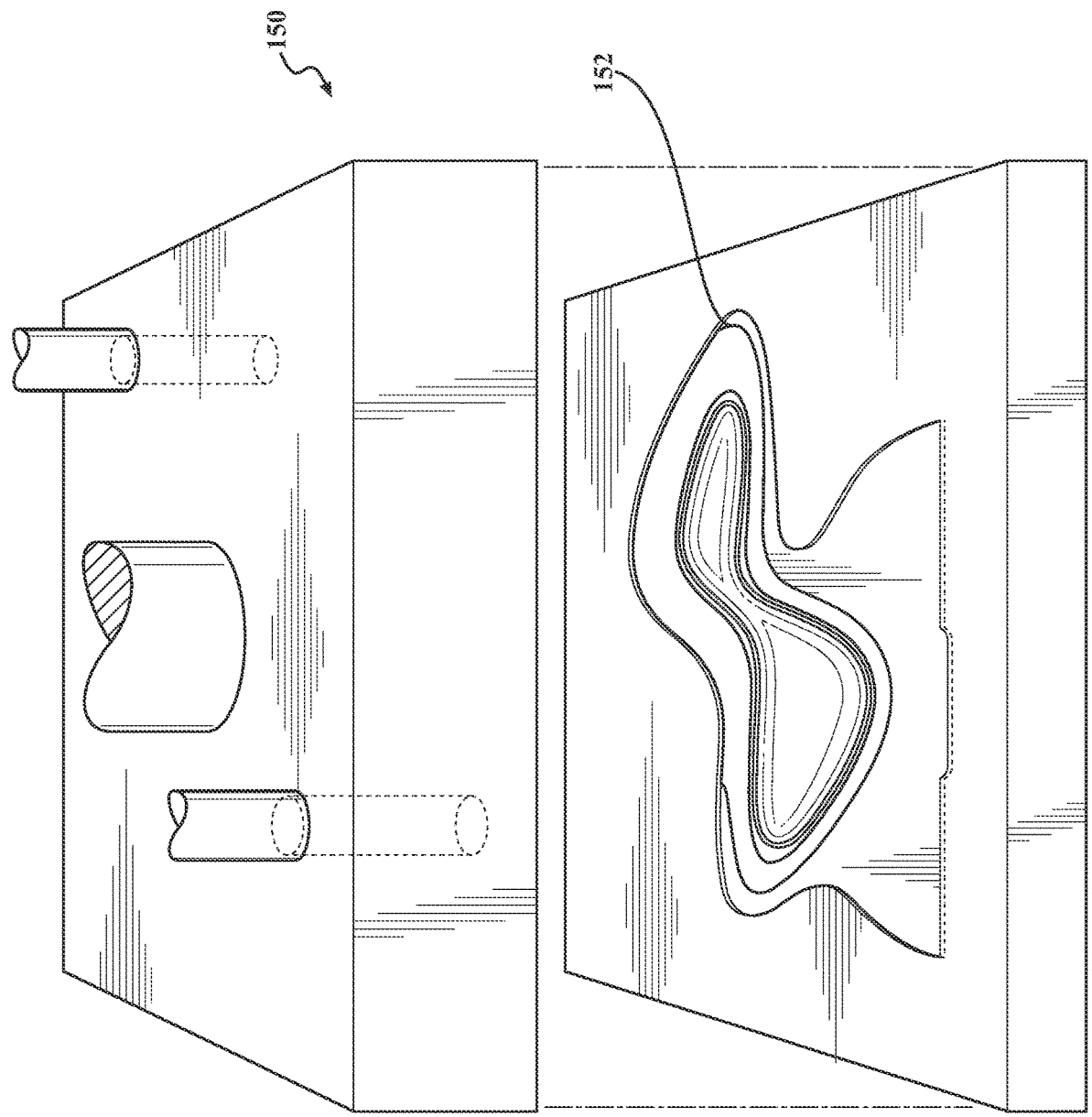
FIG. 12 is a perspective view of a mold shown in an open state for use in making the bladder assembly of FIG. 8.
Figure 13:
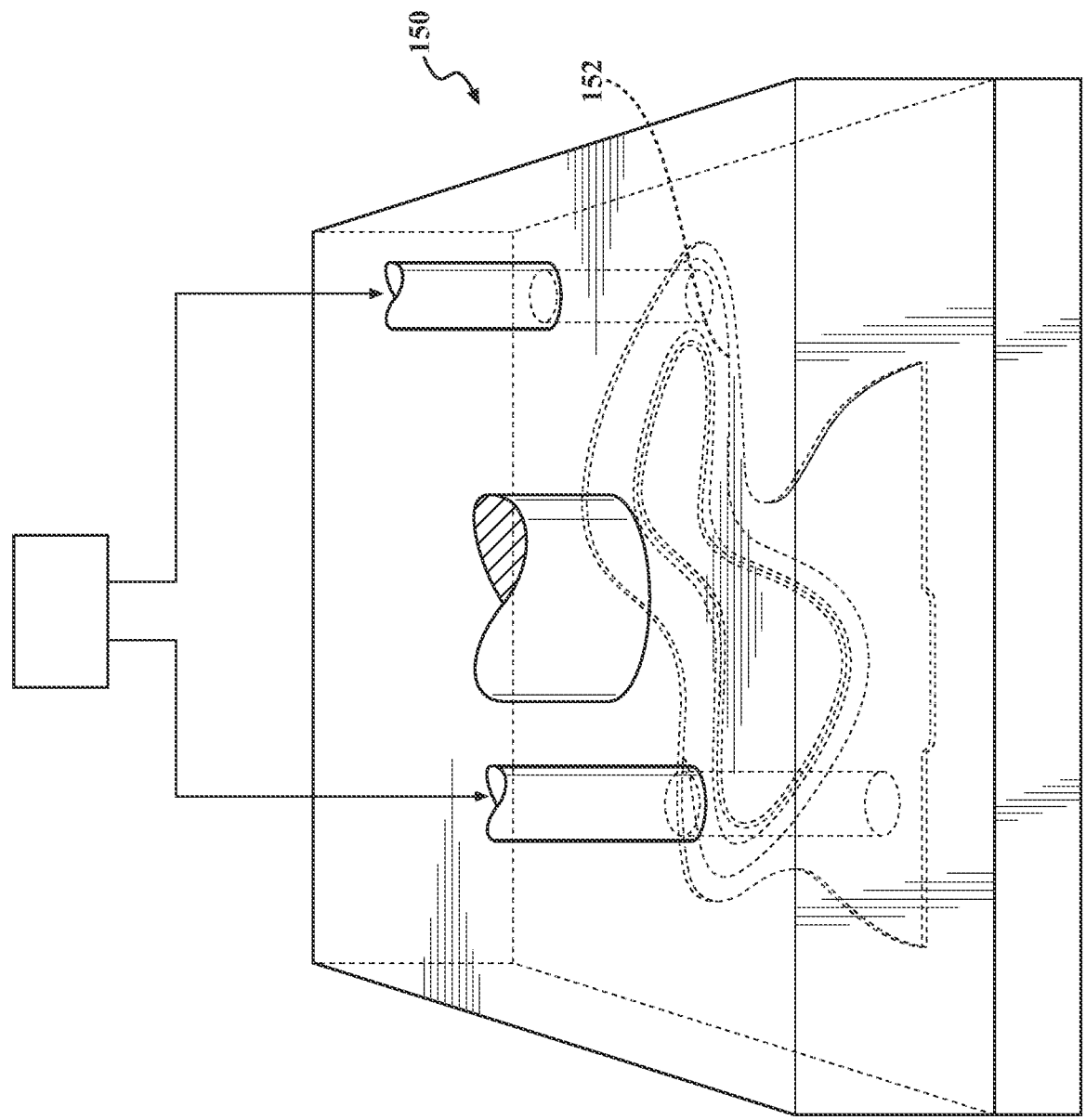
FIG. 13 is a perspective view of the mold of FIG. 12 shown in a closed state and forming a bladder assembly of FIG. 8.

Following formation and pressurization of the fluid-filled chambers 74, the fluid-filled chambers 74 may be inserted into a mold 150 for attachment to the frame 76. Namely, the fluid-filled chambers 74 may be inserted into a cavity 152 of the mold 150 when the mold 150 is in an open state, as shown in FIG. 12. Prior to insertion of the fluid-filled chamber 74 into the cavity 152, a sheet of reinforcement textile and hot melt adhesive may first be inserted into the cavity 152 for attachment to the fluid-filled chamber 74. At this point, the fluid-filled chamber 74 may be inserted into the cavity 152 on the hot melt adhesive and the mold 150 may be closed. The PU material may be injected into the cavity 152 after insertion of the reinforcement textile, hot melt adhesive, and fluid-filled chamber 74. Additionally, the material forming the reinforcement 78 may also be injected into the cavity 152 when the mold 150 is in the closed state.

While the PU material and material forming the reinforcement 78 are described as being injected into the cavity 152 when the mold 150 is in the closed state, these elements could be formed as separate elements and layered on top of the fluid-filled chamber 74 prior to the mold 150 being moved into the closed state. Regardless of whether the reinforcement 78 and PU material are formed into a finished shape prior to being inserted into the mold 150, when the fluid-filled chamber 74 and materials forming the frame 76 are inserted into the cavity 152 and the mold 150 is a closed state, heat and/or pressure are applied within the mold 150 at the cavity 152 to thereby bond the materials of the fluid-filled chamber, the frame 76, and the reinforcement 78 together.

Once the materials of the fluid-filled chamber 74, the frame 76, and the reinforcement 78 are bonded together, the mold 150 may be moved into the open state (FIG. 14), and the completed bladder assembly 68, 70 may be removed from the mold 150. Following formation of the bladder assembly 68, 70, the bladder assembly 68, 70 may be attached to the upper 12 in the manner described above.

The following Clauses provide exemplary configurations for an upper for an article of footwear described above.

Clause 1: An upper for an article of footwear, the upper comprising a first material defining a void operable to selectively receive a foot, the first material including an outer surface, a first edge at least partially circumscribing the void at an uppermost extremity of the upper, a second edge disposed at a lowermost extremity of the upper, and a first biasing member (i) disposed at the outer surface of the upper, (ii) attached to the first material, and (iii) spaced apart from the first edge and the second edge, the first biasing member operable to exert a biasing force on the first material to bias the first edge away from the second edge.

Clause 2: The upper of Clause 1, wherein the first biasing member is disposed at one of a medial side and a lateral side of the upper.

Clause 3: The upper of Clause 2, wherein the first biasing member is a first fluid-filled chamber.

Clause 4: The upper of Clause 3, wherein the first fluid-filled chamber forms an outer surface of the upper.

Clause 5: The upper of Clause 3, wherein the first fluid-filled chamber is pressurized.

Clause 6: The upper of Clause 3, further comprising a second biasing member disposed at the other of the medial side and the lateral side.

Clause 7: The upper of Clause 6, wherein the second biasing member is a second fluid-filled chamber.

Clause 8: The upper of Clause 7, wherein at least one of the first fluid-filled chamber and the second fluid-filled chamber is elongate.

Clause 9: The upper of Clause 8, wherein the at least one of the first fluid-filled chamber and the second fluid-filled chamber includes a longitudinal axis that extends in a direction between an anterior end of the upper and a posterior end of the upper.

Clause 10: An article of footwear incorporating the upper of any of the preceding Clauses.

Clause 11: An upper for an article of footwear, the upper comprising a first material defining a void operable to selectively receive a foot, the first material including an outer surface, a first edge partially circumscribing the void at an uppermost extremity of the upper on a medial side of the upper, a second edge partially circumscribing the void at the uppermost extremity of the upper on a lateral side of the upper, a first biasing member (i) disposed at the outer surface of the upper at a medial side of the upper, (ii) attached to the first material, and (iii) spaced apart from the first edge; and a second biasing member (i) disposed at the outer surface of the upper at a lateral side of the upper, (ii) attached to the first material, and (iii) spaced apart from the second edge, the first biasing member and the second biasing member operable to exert a biasing force on the first material to bias the first edge and the second edge away from one another.

Clause 12: The upper of Clause 11, wherein the first biasing member is a first fluid-filled chamber.

Clause 13: The upper of Clause 12, wherein the second biasing member is a second fluid-filled chamber.

Clause 14: The upper of Clause 13, wherein the first fluid-filled chamber forms an outer surface of the upper at the medial side and the second fluid-filled chamber forms an outer surface of the upper at the lateral side.

Clause 15: The upper of Clause 13, wherein the first fluid-filled chamber and the second fluid-filled chamber are pressurized.

Clause 16: The upper of Clause 13, further comprising a gap disposed between at least one of (i) the first fluid-filled chamber and the first material and (ii) the second fluid-filled chamber and the first material.

Clause 17: The upper of Clause 13, wherein the first material is visible through the first fluid-filled chamber and the second fluid-filled chamber.

Clause 18: The upper of Clause 13, wherein at least one of the first fluid-filled chamber and the second fluid-filled chamber is elongate.

Clause 19: The upper of Clause 18, wherein the at least one of the first fluid-filled chamber and the second fluid-filled chamber includes a longitudinal axis that extends in a direction between an anterior end of the upper and a posterior end of the upper.

Clause 20: An article of footwear incorporating the upper of any of the preceding Clauses.

Clause 21: An upper for an article of footwear, the upper comprising a first material defining a void operable to selectively receive a foot, and a bladder assembly (i) disposed at an outer surface of the upper, (ii) attached to the first material, and (iii) including a fluid-filled chamber and a flange extending around an outer perimeter of the fluid-filled chamber, the flange being formed from a different material than a material of the fluid-filled chamber and securing the fluid-filled chamber to the first material.

Clause 22: The upper of Clause 21, wherein the flange is formed from thermoplastic polyurethane (TPU).

Clause 23: The upper of any of the preceding Clauses, wherein the flange is sewn to the first material via stitching to attach the fluid-filled chamber to the first material.

Clause 24: The upper of Clause 23, wherein a material of the flange is bonded to the first material to attach the fluid-filled chamber to the first material.

Clause 25: The upper of any of the preceding Clauses, wherein a material of the flange is bonded to the first material to attach the fluid-filled chamber to the first material.

Clause 26: The upper of any of the preceding Clauses, wherein the flange includes a reinforced section.

Clause 27: The upper of Clause 26, wherein the reinforced section includes at least one of a different thickness and a different material than the flange.

Clause 28: The upper of Clause 26, wherein the reinforced section includes at least one aperture, the at least one aperture operable to receive a fastener to selectively constrict the upper.

Clause 29: The upper of any of the preceding Clauses, wherein the flange includes a first portion attached to the first material and a second portion movable relative to the first material.

Clause 30: The upper of any of the preceding Clauses, wherein the bladder assembly is disposed at a medial side of the upper, a lateral side of the upper, or a vamp portion of the upper.

Clause 31: The upper of any of the preceding Clauses, wherein the fluid-filled chamber is formed from a first barrier layer and a second barrier layer, the first barrier layer and the second barrier layer being joined together to define an interior void operable to receive a fluid.

Clause 32: The upper of Clause 31, wherein the fluid is air.

Clause 33: The upper of Clause 31, wherein the fluid is pressurized.

Clause 34: The upper of Clause 31, wherein the first barrier layer and the second barrier layer are substantially transparent.

Clause 35: The upper of Clause 34, wherein at least one of the first barrier layer and the second barrier layer includes a graphic.

Clause 36: The upper of Clause 35, wherein the graphic is viewable through the first barrier layer.

Clause 37: The upper of Clause 31, wherein one of the first barrier layer and the second barrier layer is substantially transparent and the other of the first barrier layer and the second barrier layer is opaque.

Clause 38: The upper of Clause 37, wherein the other of the first barrier layer and the second barrier layer includes a graphic.

Clause 39: The upper of Clause 38, wherein the graphic is viewable through the first barrier layer.

Clause 40: An article of footwear incorporating the upper of any of the preceding Clauses.

Clause 41: An upper for an article of footwear, the upper comprising a first material defining a void operable to selectively receive a foot, and a bladder assembly (i) disposed at an outer surface of the upper, (ii) attached to the first material, and (iii) including a fluid-filled chamber and a flange extending around an outer perimeter of the fluid-filled chamber, the flange having a greater rigidity than the fluid-filled chamber and securing the fluid-filled chamber to the first material.

Clause 42: The upper of Clause 41, wherein the flange is formed from thermoplastic polyurethane (TPU).

Clause 43: The upper of any of the preceding Clauses, wherein the flange is sewn to the first material via stitching to attach the fluid-filled chamber to the first material.

Clause 44: The upper of Clause 43, wherein a material of the flange is bonded to the first material to attach the fluid-filled chamber to the first material.

Clause 45: The upper of any of the preceding Clauses, wherein a material of the flange is bonded to the first material to attach the fluid-filled chamber to the first material.

Clause 46: The upper of any of the preceding Clauses, wherein the flange includes a reinforced section.

Clause 47: The upper of Clause 46, wherein the reinforced section includes at least one of a different thickness and a different material than the flange.

Clause 48: The upper of Clause 46, wherein the reinforced section includes at least one aperture, the at least one aperture operable to receive a fastener to selectively constrict the upper.

Clause 49: The upper of any of the preceding Clauses, wherein the flange includes a first portion attached to the first material and a second portion movable relative to the first material.

Clause 50: The upper of any of the preceding Clauses, wherein the bladder assembly is disposed at a medial side of the upper, a lateral side of the upper, or a vamp portion of the upper.

Clause 51: The upper of any of the preceding Clauses, wherein the fluid-filled chamber is formed from a first barrier layer and a second barrier layer, the first barrier layer and the second barrier layer being joined together to define an interior void operable to receive a fluid.

Clause 52: The upper of Clause 51, wherein the fluid is air.

Clause 53: The upper of Clause 51, wherein the fluid is pressurized.

Clause 54: The upper of Clause 51, wherein the first barrier layer and the second barrier layer are substantially transparent.

Clause 55: The upper of Clause 54, wherein at least one of the first barrier layer and the second barrier layer includes a graphic.

Clause 56: The upper of Clause 55, wherein the graphic is viewable through the first barrier layer.

Clause 57: The upper of Clause 51, wherein one of the first barrier layer and the second barrier layer is substantially transparent and the other of the first barrier layer and the second barrier layer is opaque.

Clause 58: The upper of Clause 57, wherein the other of the first barrier layer and the second barrier layer includes a graphic.

Clause 59: The upper of Clause 58, wherein the graphic is viewable through the first barrier layer.

Clause 60: An article of footwear incorporating the upper of any of the preceding Clauses.

Clause 61: An upper for an article of footwear, the upper comprising a first material defining a void operable to selectively receive a foot, and a bladder assembly (i) disposed at an outer surface of the upper, (ii) attached to the first material, and (iii) including a fluid-filled chamber and a flange (a) extending around an outer perimeter of the fluid-filled chamber and (b) securing the fluid-filled chamber to the first material, the fluid-filled chamber and the flange being movable relative to the first material.

Clause 62: The upper of Clause 61, wherein the flange is formed from thermoplastic polyurethane (TPU).

Clause 63: The upper of any of the preceding Clauses, wherein the flange is sewn to the first material via stitching along a portion of the flange to attach the fluid-filled chamber to the first material.

Clause 64: The upper of Clause 63, wherein a material of the flange is bonded to the first material to attach the fluid-filled chamber to the first material.

Clause 65: The upper of any of the preceding Clauses, wherein a material of the flange is bonded to the first material to attach the fluid-filled chamber to the first material.

Clause 66: The upper of any of the preceding Clauses, wherein the flange includes a reinforced section.

Clause 67: The upper of Clause 66, wherein the reinforced section includes at least one of a different thickness and a different material than the flange.

Clause 68: The upper of Clause 66, wherein the reinforced section includes at least one aperture, the at least one aperture operable to receive a fastener to selectively constrict the upper.

Clause 69: The upper of any of the preceding Clauses, wherein the flange includes a first portion attached to the first material and a second portion spaced apart from the first material, the second portion being movable relative to the first material.

Clause 70: The upper of any of the preceding Clauses, wherein the bladder assembly is disposed at a medial side of the upper, a lateral side of the upper, or a vamp portion of the upper.

Clause 71: The upper of any of the preceding Clauses, wherein the fluid-filled chamber is formed from a first barrier layer and a second barrier layer, the first barrier layer and the second barrier layer being joined together to define an interior void operable to receive a fluid.

Clause 72: The upper of Clause 71, wherein the fluid is air.

Clause 73: The upper of Clause 71, wherein the fluid is pressurized.

Clause 74: The upper of Clause 71, wherein the first barrier layer and the second barrier layer are substantially transparent.

Clause 75: The upper of Clause 74, wherein at least one of the first barrier layer and the second barrier layer includes a graphic.

Clause 76: The upper of Clause 75, wherein the graphic is viewable through the first barrier layer.

Clause 77: The upper of Clause 71, wherein one of the first barrier layer and the second barrier layer is substantially transparent and the other of the first barrier layer and the second barrier layer is opaque.

Clause 78: The upper of Clause 77, wherein the other of the first barrier layer and the second barrier layer includes a graphic.

Clause 79: The upper of Clause 78, wherein the graphic is viewable through the first barrier layer.

Clause 80: An article of footwear incorporating the upper of any of the preceding Clauses.

Clause 81: An upper for an article of footwear, the upper comprising a first material defining a void operable to selectively receive a foot, and a bladder assembly (i) disposed at an outer surface of the upper, (ii) attached to the first material, and (iii) including a fluid-filled chamber and a flange (a) extending around an outer perimeter of the fluid-filled chamber and (b) securing the fluid-filled chamber to the first material, the fluid-filled chamber including a first region and a second region in fluid communication with one another and joined by a passageway having a smaller cross-sectional area than the first region and the second region.

Clause 82: The upper of Clause 81, wherein the flange is formed from thermoplastic polyurethane (TPU).

Clause 83: The upper of any of the preceding Clauses, wherein the flange is sewn to the first material via stitching to attach the fluid-filled chamber to the first material.

Clause 84: The upper of Clause 83, wherein a material of the flange is bonded to the first material to attach the fluid-filled chamber to the first material.

Clause 85: The upper of any of the preceding Clauses, wherein a material of the flange is bonded to the first material to attach the fluid-filled chamber to the first material.

Clause 86: The upper of any of the preceding Clauses, wherein the flange includes a reinforced section.

Clause 87: The upper of Clause 86, wherein the reinforced section includes at least one of a different thickness and a different material than the flange.

Clause 88: The upper of Clause 86, wherein the reinforced section includes at least one aperture, the at least one aperture operable to receive a fastener to selectively constrict the upper.

Clause 89: The upper of any of the preceding Clauses, wherein the flange includes a first portion attached to the first material and a second portion movable relative to the first material.

Clause 90: The upper of any of the preceding Clauses, wherein the bladder assembly is disposed at a medial side of the upper, a lateral side of the upper, or a vamp portion of the upper.

Clause 91: The upper of any of the preceding Clauses, wherein the fluid-filled chamber is formed from a first barrier layer and a second barrier layer, the first barrier layer and the second barrier layer being joined together to define an interior void operable to receive a fluid.

Clause 92: The upper of Clause 91, wherein the fluid is air.

Clause 93: The upper of Clause 91, wherein the fluid is pressurized.

Clause 94: The upper of Clause 91, wherein the first barrier layer and the second barrier layer are substantially transparent.

Clause 95: The upper of Clause 94, wherein at least one of the first barrier layer and the second barrier layer includes a graphic.

Clause 96: The upper of Clause 95, wherein the graphic is viewable through the first barrier layer.

Clause 97: The upper of Clause 91, wherein one of the first barrier layer and the second barrier layer is substantially transparent and the other of the first barrier layer and the second barrier layer is opaque.

Clause 98: The upper of Clause 97, wherein the other of the first barrier layer and the second barrier layer includes a graphic.

Clause 99: The upper of Clause 98, wherein the graphic is viewable through the first barrier layer.

Clause 100: An article of footwear incorporating the upper of any of the preceding Clauses.

Clause 101: An upper for an article of footwear, the upper comprising a first material defining a void operable to selectively receive a foot, and a bladder assembly (i) disposed at an outer surface of the upper, (ii) attached to the first material, and (iii) including a fluid-filled chamber and a flange (a) extending around an outer perimeter of the fluid-filled chamber and (b) securing the fluid-filled chamber to the first material, the fluid-filled chamber opposing and in contact with the first material.

Clause 102: The upper of Clause 101, wherein the flange is formed from thermoplastic polyurethane (TPU).

Clause 103: The upper of any of the preceding Clauses, wherein the flange is sewn to the first material via stitching along a portion of the flange to attach the fluid-filled chamber to the first material.

Clause 104: The upper of Clause 103, wherein a material of the flange is bonded to the first material to attach the fluid-filled chamber to the first material.

Clause 105: The upper of any of the preceding Clauses, wherein a material of the flange is bonded to the first material to attach the fluid-filled chamber to the first material.

Clause 106: The upper of any of the preceding Clauses, wherein the flange includes a reinforced section.

Clause 107: The upper of Clause 106, wherein the reinforced section includes at least one of a different thickness and a different material than the flange.

Clause 108: The upper of Clause 106, wherein the reinforced section includes at least one aperture, the at least one aperture operable to receive a fastener to selectively constrict the upper.

Clause 109: The upper of any of the preceding Clauses, wherein the flange includes a first portion attached to the first material and a second portion spaced apart from the first material, the second portion being movable relative to the first material.

Clause 110: The upper of any of the preceding Clauses, wherein the bladder assembly is disposed at a medial side of the upper, a lateral side of the upper, or a vamp portion of the upper.

Clause 111: The upper of any of the preceding Clauses, wherein the fluid-filled chamber is formed from a first barrier layer and a second barrier layer, the first barrier layer and the second barrier layer being joined together to define an interior void operable to receive a fluid.

Clause 112: The upper of Clause 111, wherein the fluid is air.

Clause 113: The upper of Clause 111, wherein the fluid is pressurized.

Clause 114: The upper of Clause 111, wherein the first barrier layer and the second barrier layer are substantially transparent.

Clause 115: The upper of Clause 114, wherein at least one of the first barrier layer and the second barrier layer includes a graphic.

Clause 116: The upper of Clause 115, wherein the graphic is viewable through the first barrier layer.

Clause 117: The upper of Clause 111, wherein one of the first barrier layer and the second barrier layer is substantially transparent and the other of the first barrier layer and the second barrier layer is opaque.

Clause 118: The upper of Clause 117, wherein the other of the first barrier layer and the second barrier layer includes a graphic.

Clause 119: The upper of Clause 118, wherein the graphic is viewable through the first barrier layer.

Clause 120: An article of footwear incorporating the upper of any of the preceding Clauses.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. An upper for an article of footwear, the upper comprising:
   a first material defining a void operable to selectively receive a foot, the first material including an outer surface;
   a first edge at least partially circumscribing the void at an uppermost extremity of the upper;

a second edge disposed at a lowermost extremity of the upper; and a first biasing member (i) disposed at the outer surface of the upper, (ii) attached to the first material, (iii) spaced apart from the first edge and the second edge, and (iv) including a first fluid-filled chamber defined by a first chamber portion, a second chamber portion, and a third chamber portion smaller than the first chamber portion and the second chamber portion and extending between the first chamber portion and the second chamber portion to form an articulation point of the first fluid-filled chamber, the first biasing member operable to exert a biasing force on the first material to bias the first edge away from the second edge.

2. The upper of claim 1, wherein the first biasing member is disposed at one of a medial side and a lateral side of the upper.

3. The upper of claim 2, further comprising a second biasing member disposed at the other of the medial side and the lateral side.

4. The upper of claim 3, wherein the second biasing member is a second fluid-filled chamber.

5. The upper of claim 4, wherein at least one of the first fluid-filled chamber and the second fluid-filled chamber is elongate.

6. The upper of claim 5, wherein the at least one of the first fluid-filled chamber and the second fluid-filled chamber includes a longitudinal axis that extends in a direction between an anterior end of the upper and a posterior end of the upper.

7. The upper of claim 1, wherein the first fluid-filled chamber forms an outer surface of the upper.

8. The upper of claim 1, wherein the first fluid-filled chamber is pressurized.

9. An article of footwear incorporating the upper of claim 1.

10. An upper for an article of footwear, the upper comprising:

a first material defining a void operable to selectively receive a foot, the first material including an outer surface;

a first edge partially circumscribing the void at an uppermost extremity of the upper on a medial side of the upper;

a second edge partially circumscribing the void at the uppermost extremity of the upper on a lateral side of the upper;

a first biasing member (i) disposed at the outer surface of the upper at a medial side of the upper, (ii) attached to the first material, (iii) spaced apart from the first edge, and (iv) including a first fluid-filled chamber defined by a first chamber portion, a second chamber portion, and a third chamber portion smaller than the first chamber portion and the second chamber portion and extending between the first chamber portion and the second chamber portion to form an articulation point of the first fluid-filled chamber; and a second biasing member (i) disposed at the outer surface of the upper at a lateral side of the upper, (ii) attached to the first material, and (iii) spaced apart from the second edge, the first biasing member and the second biasing member operable to exert a biasing force on the first material to bias the first edge and the second edge away from one another.

11. The upper of claim 10, wherein the second biasing member is a second fluid-filled chamber.

12. The upper of claim 11, wherein the first fluid-filled chamber forms an outer surface of the upper at the medial side and the second fluid-filled chamber forms an outer surface of the upper at the lateral side.

13. The upper of claim 11, wherein the first fluid-filled chamber and the second fluid-filled chamber are pressurized.

14. The upper of claim 11, further comprising a gap disposed between at least one of (i) the first fluid-filled chamber and the first material and (ii) the second fluid-filled chamber and the first material.

15. The upper of claim 11, wherein the first material is visible through the first fluid-filled chamber and the second fluid-filled chamber.

16. The upper of claim 11, wherein at least one of the first fluid-filled chamber and the second fluid-filled chamber is elongate.

17. The upper of claim 16, wherein the at least one of the first fluid-filled chamber and the second fluid-filled chamber includes a longitudinal axis that extends in a direction between an anterior end of the upper and a posterior end of the upper.

18. An article of footwear incorporating the upper of claim 10.

* * * * *